(12) United States Patent
Kurita et al.

(10) Patent No.: US 10,474,722 B2
(45) Date of Patent: Nov. 12, 2019

(54) COMMUNICATION SYSTEM, COMMUNICATION APPARATUS, AND METHOD OF COMMUNICATION

(71) Applicant: FUJITSU LIMITED, Kawasaki-shi, Kanagawa (JP)

(72) Inventors: Toshihiko Kurita, Kawasaki (JP); Izuru Sato, Chiyoda (JP); Kenichi Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 15/295,970

(22) Filed: Oct. 17, 2016

(65) Prior Publication Data
US 2017/0169110 A1  Jun. 15, 2017

(30) Foreign Application Priority Data
Dec. 10, 2015 (JP) .................................. 2015-241615

(51) Int. Cl.
*G06F 16/951* (2019.01)
*G06F 16/957* (2019.01)
*H04L 12/937* (2013.01)

(52) U.S. Cl.
CPC .......... *G06F 16/951* (2019.01); *G06F 16/957* (2019.01); *H04L 49/253* (2013.01)

(58) Field of Classification Search
CPC ................. G06F 17/30864; G06F 17/30899
USPC ........................................................ 707/708
See application file for complete search history.

(56) References Cited

U.S. PATENT DOCUMENTS

2015/0081709 A1* 3/2015 Fukuda .................. G06Q 50/12
                                                             707/737
2017/0242875 A1* 8/2017 Jiang ................. G06F 17/30554

FOREIGN PATENT DOCUMENTS

| JP | 2001-273298 | 10/2001 |
| JP | 2007-249514 | 9/2007 |
| JP | 2008-504609 | 2/2008 |
| JP | 2008-123239 | 5/2008 |

(Continued)

OTHER PUBLICATIONS

JPOA—Japanese Office Action dated Aug. 13, 2019 for corresponding Japanese Patent Application No. 2015-241615 with Machine Translation.

*Primary Examiner* — Joshua Bullock
(74) *Attorney, Agent, or Firm* — Fujitsu Patent Center

(57) ABSTRACT

A communication system includes a first information processing apparatus, and a communication apparatus including a plurality of ports, the communication apparatus being configured to communicate with the first information processing apparatus through a first port, wherein a first content is stored in the first information processing apparatus, and the communication apparatus is configured to store first correspondence information that indicates a correspondence relationship between a first keyword related to the first content and the first port, receive, from the terminal apparatus, a first search request that includes a search word, when the search word includes the first keyword, specify the first port corresponding to the first keyword from the plurality of ports, send, through the first port, the first search request to the first information processing apparatus, acquire the first content from the first information processing apparatus, and send the first content to the terminal apparatus.

20 Claims, 22 Drawing Sheets

(56) References Cited

FOREIGN PATENT DOCUMENTS

| JP | 2011-215713 | 10/2011 |
|----|-------------|---------|
| WO | 2006/012284 | 2/2006  |

\* cited by examiner

COMMUNICATION SYSTEM, COMMUNICATION APPARATUS, AND METHOD OF COMMUNICATION

CROSS-REFERENCE TO RELATED APPLICATION

This application is based upon and claims the benefit of priority of the prior Japanese Patent Application No. 2015-241615, filed on Dec. 10, 2015, the entire contents of which are incorporated herein by reference.

FIELD

The embodiments discussed herein are related to a communication system, a communication apparatus, and a method of communication.

BACKGROUND

When, for example, a user acquires content stored in a server in a communication system on an IP network, the user accesses a search server and specifies a keyword related to the content for the search server by using a personal computer (simply referred to below as the PC). As a result, the PC acquires, from the search server, the uniform resource locator (URL) of a content name list related to the keyword.

Furthermore, the PC accesses a domain name system (DNS) server, after which the user specifies a content name from the content name list, and the PC acquires the IP address of the server that stores content corresponding to the specified content name.

Then, the PC establishes coupling with the server according to the acquired IP address and specifies a content name in http to request the server for the content. In response to the content request, the server stores the content in a content response and returns it to the PC. As a result, the PC can acquire desired content from a server in the communication system through a keyword-based content search. Related art documents include Japanese National Publication of International Patent Application No. 2008-504609, Japanese Laid-open Patent Publication No. 2007-249514, and Japanese Laid-open Patent Publication No. 2001-273298.

SUMMARY

According to an aspect of the invention, a communication system includes a first information processing apparatus including a first memory and a first processor coupled to the first memory, and a communication apparatus including a second memory, a plurality of ports and a second processor coupled to the second memory and the plurality of ports, the communication apparatus being configured to communicate with the terminal apparatus, the communication apparatus being configured to communicate with the first information processing apparatus through a first port of the plurality of ports, wherein a first content is stored in the first information processing apparatus, and the second processor is configured to store, in the second memory, first correspondence information that indicates a correspondence relationship between a first keyword related to the first content and the first port to which the first information processing apparatus is coupled, receive, from the terminal apparatus, a first search request that includes a search word, when the search word includes the first keyword, specify the first port corresponding to the first keyword from the plurality of ports based on the first correspondence information, send, through the first port, the first search request to the first information processing apparatus, acquire, through the first port, the first content from the first information processing apparatus, and send the first content to the terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a communication system, when a user acquires desired content from a server, the user accesses a search server and a DNS server and acquires the IP address of the server in which the desired content is stored. However, each time, the PC is expected to access the search server and DNS server by using the keyword of the desired content, so a load on the keyword-based content search becomes large.

Embodiments of the communication apparatus, server apparatus, and communication system disclosed in this application will be described below in detail according to the drawings. Incidentally, the disclosed technology is not restricted by these embodiments. The embodiments indicated below may be appropriately combined within a range in which any contradiction does not occur.

First Embodiment

Figure 1:
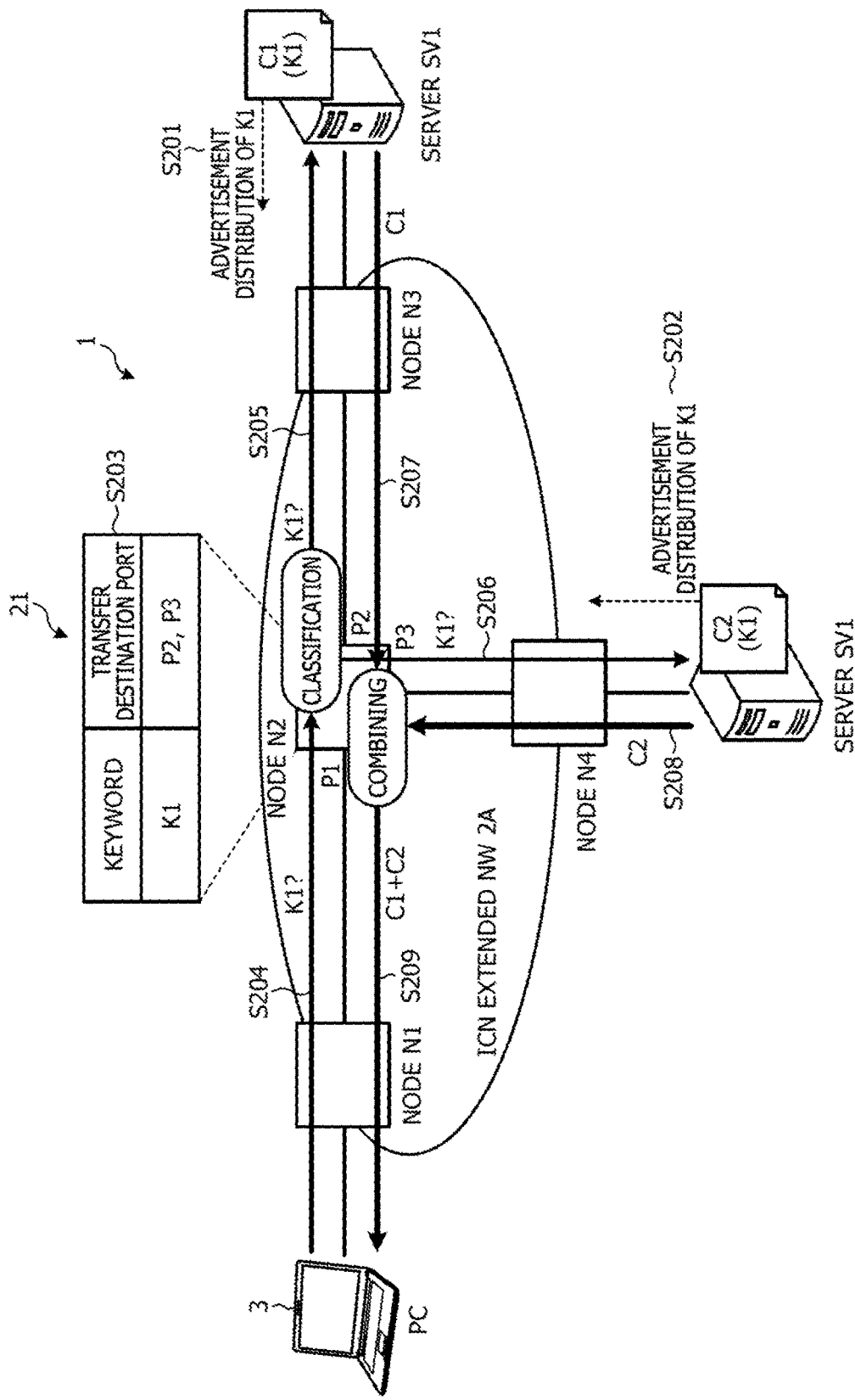
FIG. 1 is an explanatory diagram illustrating an example of a communication system in a first embodiment.

FIG. 1 is an explanatory diagram illustrating an example of a communication system 1 in a first embodiment. The communication system 1 illustrated in FIG. 1 is, for example, a system comprised of an information centric networking (ICN) extended network 2A and the like. ICN is a service by which desired content can be acquired by, for example, specifying the content name of the desired content. The content name is the name of content. Although the content name is unique in the communication system 1, a cache for the content may be present in a plurality of servers.

The communication system 1 illustrated in FIG. 1 has a personal computer (simply referred to below as the PC) 3, a plurality of nodes N1 to N4, and a plurality of servers SV1 and SV2. The PC 3 is coupled to and communicates with the node N1. The server SV1 is coupled to and communicates with the node N3. The server SV1 stores content C1 including a keyword K1 and enables the content C1 to be provided. The server SV2 is coupled to and communicates with the node N4. The server SV2 stores content C2 including the keyword K1 and enables the content C2 to be provided.

The node N2 is coupled to and communicates with the nodes N1, N3, and N4. The server SV1 distributes the keyword K1 and the like related to the content C1, which is being stored in the server SV1, to the nodes N1 to N4 on the ICN extended NW 2A at a predetermined time. The server SV2 also distributes the keyword K1 and the like related to the content C2, which is being stored in the server SV2, to the nodes N1 to N4 on the ICN extended NW 2A at a predetermined time. Incidentally, the ICN extended NW 2A enables the routing of a request by using a keyword as described later; by comparison, the ICN NW enables the routing of a request by using a content name.

Figure 2:
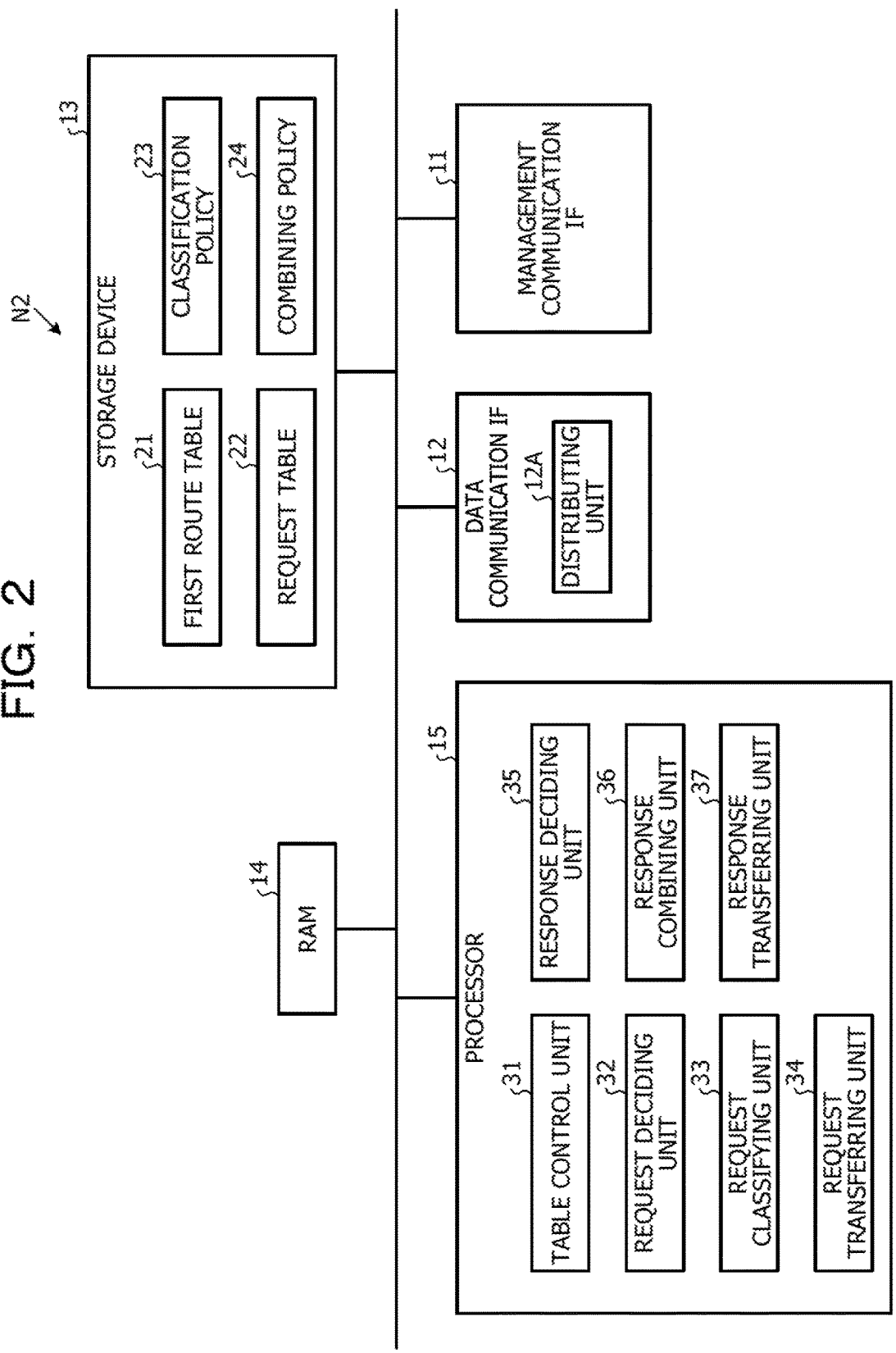
FIG. 2 is an explanatory diagram illustrating an example of the structure of a node.

FIG. 2 is an explanatory diagram illustrating an example of the structure of the nodes N1 to N4. Incidentally, for convenience of explanation, the node N2 will be exemplified. Since the nodes N1, N3, and N4 also have the same structure as the node N2, like constituent elements will be denoted by like reference numerals and the descriptions of duplicated constituent elements and operations will be omitted. The node N2 illustrated in FIG. 2 has a management communication interface (IF) 11, a data communication IF 12, a storage device 13, a random access memory (RAM) 14, and a processor 15. The management communication IF 11 is a communication IF that controls communication with a management terminal (not illustrated) that manages the node N2 itself. The data communication IF 12 is a communication IF that controls data communication with a line of the ICN extended NW 2A. Incidentally, the data communication IF 12 has a plurality of ports P coupled on a per line basis and also has a distributing unit 12A, which receives data coming from each port P and distributes data to each port P. The storage device 13 is an area in which various types of information is stored. The RAM 14 is a work area for processes executed by the processor 15. The processor 15 controls the whole of the node N2.

Figure 3:
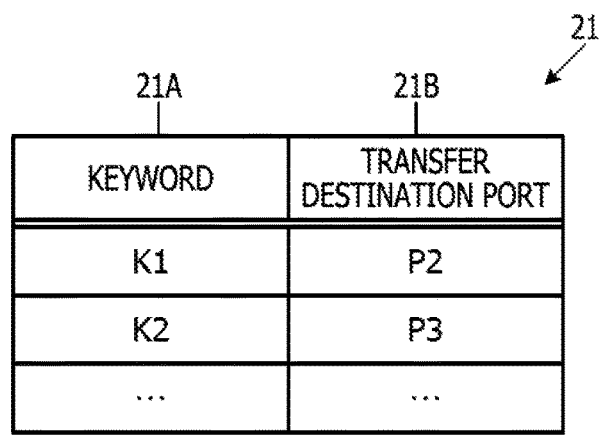
FIG. 3 is an example of the table structure of a first route table.

The storage device 13 has a first route table 21, a request table 22, a classification policy 23, and a combining policy 24. FIG. 3 is an explanatory diagram illustrating an example of the table structure of the first route table 21. The first route table 21 illustrated in FIG. 3 is, for example, a table that stores, for each keyword 21A received in advertisement distribution coming from the server SV1, a transfer destination port 21B, which is a port that receives the keyword 21A.

Figure 4:
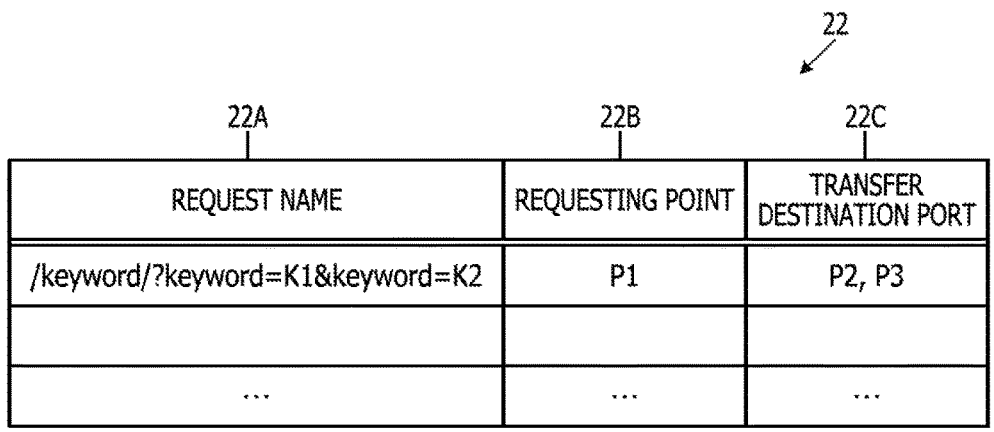
FIG. 4 is an explanatory diagram illustrating an example of the table structure of a request table.

FIG. 4 is an explanatory diagram illustrating an example of the table structure of the request table 22. The request table 22 illustrated in FIG. 4 is a table that stores, for each request name 22A that identifies a content request, a requesting port 22B that has received the content request and a transfer destination port 22C that had transferred the content request in correspondence to each other. The content request is a command from the PC 3 to the ICN extended NW 2A, the command requesting desired content to be acquired by using a keyword as a search key. Incidentally, the content request is, for example, /keyword/?keyword=K1&keyword=K2; /keyword/ in the former part is a request name and ?keyword=K1&keyword=K2 in the latter part is specified keywords. Keywords are formed by combining keywords with &, "or", and other logical operators and are written in REST format. Furthermore, an additional identifier is included in the request name so as to be identified as an uplink message or a downlink message. The requesting port 22B is a port P that receives a content request. The transfer destination port 22C is a port P that transfers a content request.

In the classification policy 23, a condition is stored, under which, for example, whether to classify the keyword in a content request is determined. In the combining policy 24, a condition is stored under which, for example, content responses for a content request are combined. If, for example, sensor data such as, for example, information about rainfalls in Kawasaki city is used as content in the Internet of Things (IoT), a combining condition is a condition under which simple merging is performed in list format by using sensor data, duplications are deleted from duplicated pieces of content, the maximum value or minimum value is selected, or an average is calculated. Incidentally, the classification condition in the classification policy 23 and the combining condition in the combining policy 24 can be appropriately changed by a manipulation specified by the user of the PC 3 or an operator in the communication system 1.

The processor 15 loads a program (not illustrated) stored in the storage device 13 into the RAM 14 and executes a process corresponding to the program as a processing function. The processor 15 has a table control unit 31, a request deciding unit 32, a request classifying unit 33, a request transferring unit 34, a response deciding unit 35, a response combining unit 36, and a response transferring unit 37.

The table control unit 31 controls storage in the first route table 21 and request table 22. When the table control unit 31 receives advertisement distributions, coming from the servers SV1 and SV2, of the keyword K1, the table control unit 31 registers the port that has received the keyword or keyword combination in the first route table 21 as the transfer destination port, on a per keyword or keyword combination basis. When the table control unit 31 receives a content request coming from the PC 3, the table control unit 31 registers, for each request name that identifies a content request, a requesting port that has received the content request and a transfer destination port to which to transfer the content request in the request table 22 in correspondence to each other.

Figure 5:
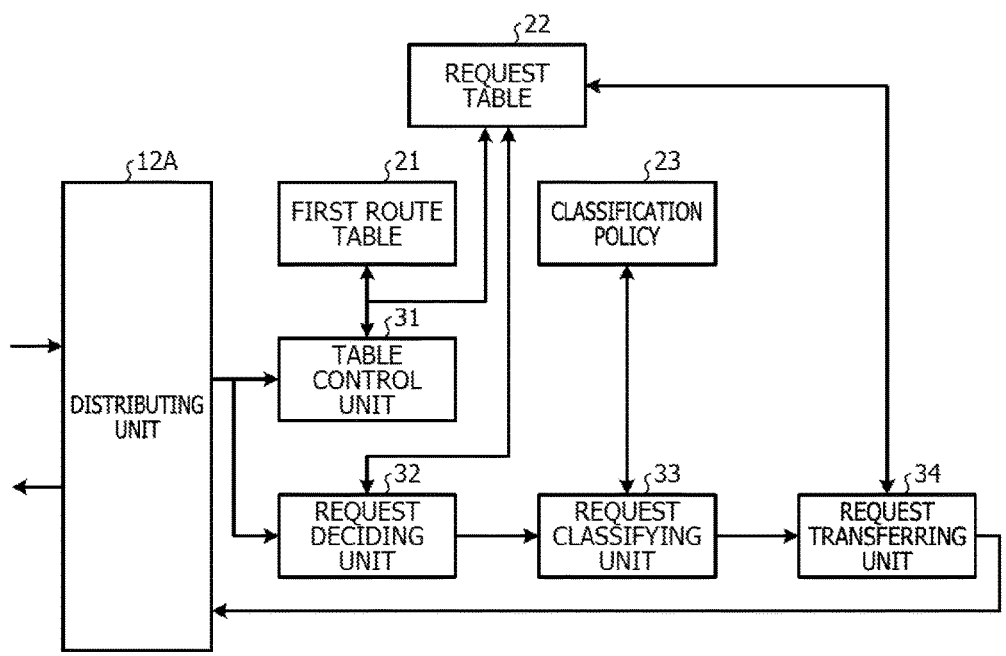
FIG. 5 is an explanatory diagram illustrating a functional structure, involved in request transfer processing, in a processor.

FIG. 5 is an explanatory diagram illustrating a functional structure, involved in request transfer processing, in the processor 15. When the request deciding unit 32 illustrated in FIG. 5 receives data through the distributing unit 12A in the data communication IF 12, the request deciding unit 32 decides whether the received data is a content request. Incidentally, the request deciding unit 32 references the request name at the front of the content request and decides whether the received data is a content request.

If the received data is a content request, the request classifying unit 33 references the classification policy 23 and classifies the keyword in the content request. If, for example, two keywords, K1 and K2, are included in the content request, the request classifying unit 33 classifies the keywords into the keyword K1 and keyword K2.

The request transferring unit 34 identifies, from the first route table 21, the port 21B corresponding to the keyword 21A extracted in the content request or to an entry including the keyword. Furthermore, the request transferring unit 34 requests the distributing unit 12A to transfer the content request to the identified transfer destination port.

When the transfer destination port for the content request is identified, the table control unit 31 registers, for each request name 22A that identifies a content request, the requesting port 22B that has received the content request and the transfer destination port 22C for the content request in the request table 22 in correspondence to each other.

Figure 6:
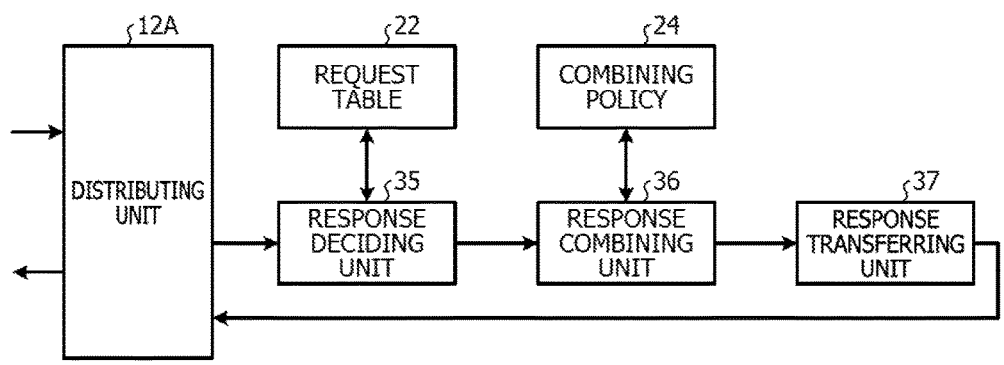
FIG. 6 is an explanatory diagram illustrating a functional structure, involved in response transfer processing, in the processor.

FIG. 6 is an explanatory diagram illustrating a functional structure, involved in response transfer processing, in the processor 15. When the response deciding unit 35 illustrated in FIG. 6 receives data through the distributing unit 12A, the response deciding unit 35 decides whether the received data is a content response. Incidentally, the response deciding unit 35 references the request table 22 and decides whether the received data is a content response depending on whether the relevant request name is present in the request table 22.

The response combining unit 36 references the request table 22 and decides whether a content response has been received from a transfer destination port for the content request. When the response combining unit 36 receives content responses from all transfer destination ports, the response combining unit 36 decides whether there is duplicated content according to the combining policy 24. The response combining unit 36 deletes duplicated content, combines each piece of content, and stores the combined content in a content response.

The response transferring unit 37 references the request table 22 and identifies a requesting port corresponding to a request name that identifies a content request involved in a content response. Furthermore, the response transferring unit 37 requests the distributing unit 12A to transfer the content response to the identified requesting port. When the content response is transferred to the requesting port, the table control unit 31 deletes, from the request table 22, the entry corresponding to the request name involved in the content request for the content response.

Next, operations of the communication system 1 in the first embodiment will be described. First, an operation of the communication system 1 will be descried that is performed when the user acquires content C1 and C2 that include the keyword K1 by using the PC 3. It will be assumed that, in the communication system 1 illustrated in FIG. 1, the content C1 is stored in the server SV1 and the content C2 is stored in the server SV2. Furthermore, it will be assumed that the server SV1 is coupled to the node N3 and the server SV2 is coupled to the node N4. The node N2 couples a line between the node N2 and the node N1 at a port P1, couples a line between the node N2 and the node N3 at a port P2, and couples a line between the node N2 and the node N4 at a port P3.

The server SV1 performs advertisement distribution of the keyword K1 related to the content C1 within the ICN extended NW 2A (step S201). The server SV2 performs advertisement distribution of the keyword K1 related to the content C2 within the ICN extended NW 2A (step S202). The node N2 receives the keyword K1 coming from the server SV1 through the port P2 coupled to the node N3, and also receives the keyword K1 coming from the server SV2 through the port P3 coupled to the node N4. As a result, the ports P2 and P3 are registered in the first route table 21 in the node N2 in correspondence to the keyword K1 (step S203).

When the node N2 receives a content request (K1?) including the keyword K1, the content request coming from the PC 3 of the user, through the port P1 (step S204), the node N2 extracts the keyword K1 included in the content request. The node N2 references the first route table 21 and identifies the ports P2 and P3 corresponding to the keyword K1.

The node N2 transfers the content request (K1?) including the keyword K1 from the port P2 through the node N3 (step S205). Furthermore, the node N2 transfers the content request (K1?) including the keyword K1 from the port P3 through the node N4 (step S206).

The server SV1 acquires the content C1 corresponding to the keyword K1 in response to the content request (K1?) including the keyword K1, stores the content C1 in a content response, and transfers the content response to the node N2 through the node N3 (step S207). The server SV2 acquires the content C2 corresponding to the keyword K1 in response to the content request (K1?) including the keyword K1, stores the content C2 in a content response, and transfers the content response to the node N2 through the node N4 (step S208).

The node N2 receives the content response including the content C1, the content response coming from the server SV1, and the content response including the content C2, the content response coming from the server SV2. Furthermore, the node N2 combines the content C1 and C2, stores the combined content in a content response, and transfers the content response (C1+C2) from the requesting port P1 for the content request (step S209). The PC 3 acquires the content response including the content C1 and C2, the content response corresponding to the content request including the keyword K1, through the node N1. As a result, the user can collect content related to the keyword K1 from the servers SV1 and SV2 within the ICN extended NW 2A in a batch.

Figure 7:
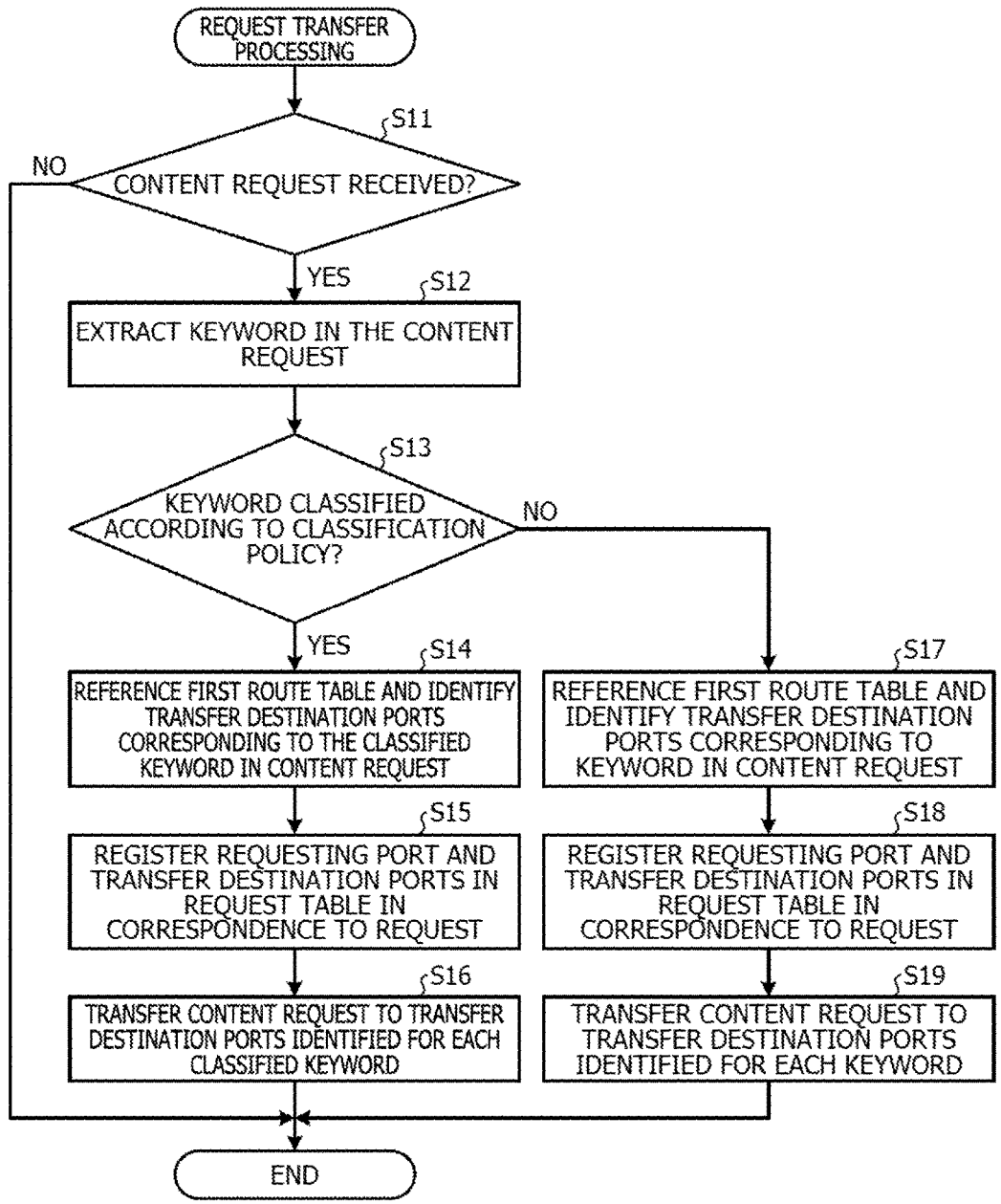
FIG. 7 is a flowchart illustrating an example of a processing operation of the processor in a node involved in request transfer processing.

FIG. 7 is a flowchart illustrating an example of a processing operation of the processor 15 in the node N2 involved in request transfer processing. In FIG. 7, the request deciding unit 32 in the processor 15 decides whether a content request has been received through the distributing unit 12A (step S11). If a content request has been received (the decision in step S11 is affirmative), the request classifying unit 33 in the processor 15 extracts the keyword in the content request (step S12). The request classifying unit 33 references the classification policy 23 and decides whether to classify the keyword in the content request (step S13).

If the keyword in the content request is to be classified (the decision in step S13 is affirmative), the request transferring unit 34 in the processor 15 references the first route table 21 and identifies transfer destination ports corresponding to the classified keyword (step S14). When transfer destination ports are identified for each keyword in step S14, the table control unit 31 in the processor 15 registers the requesting port and transfer destination ports in the request table 22 in correspondence to the request name that identifies the content request (step S15).

Furthermore, the request transferring unit 34 requests the distributing unit 12A to transfer the content request to the transfer destination ports identified for each classified keyword (step S16) and terminates the processing operation illustrated in FIG. 7. As a result, the node N2 can transfer the content request to the transfer destination port identified for each classified keyword.

If the keyword in the content request is not to be classified (the decision in step S13 is negative), the request transferring unit 34 references the first route table 21 and identifies transfer destination ports corresponding to the keyword (step S17). When a transfer destination port is identified in step S17, the table control unit 31 registers the requesting port and transfer destination ports in the request table 22 in correspondence to the request name that identifies the content request (step S18).

The request transferring unit 34 requests the distributing unit 12A to transfer the content request to the identified transfer destination ports (step S19) and terminates the processing operation illustrated in FIG. 7. As a result, the node N2 can transfer the content request to the transfer destination ports identified by the keywords. If a content request has not been received (the decision in step S11 is negative), the request deciding unit 32 terminates the processing operation illustrated in FIG. 7.

The processor 15, which executes request transfer processing illustrated in FIG. 7, receives a content request, and if the keyword in the content request is to be classified, identifies transfer destination ports corresponding to the classified keyword with reference to the first route table 21. The processor 15 transfers the content request to the identified transfer destination ports. As a result, the node N2 can transfer the content request to the transfer destination ports corresponding to the classified keyword in the content request.

The processor 15 receives a content request, and if the keyword in the content request is not to be classified, identifies a transfer destination port corresponding to the keywords with reference to the first route table 21. The processor 15 transfers the content request to the identified transfer destination port. As a result, the node N2 can transfer the content to the transfer destination ports corresponding to the keywords in the content request.

Figure 8:
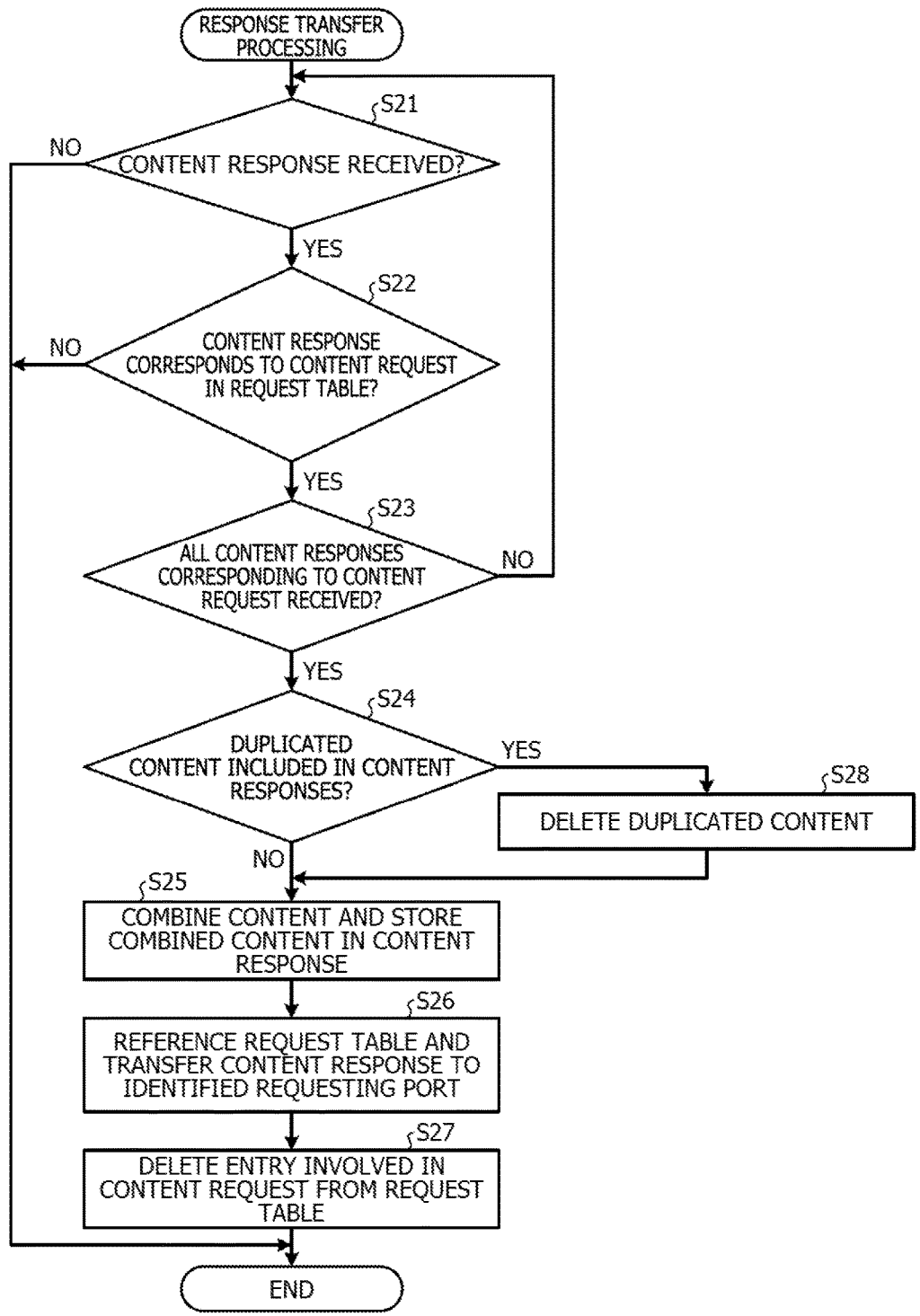
FIG. 8 is a flowchart illustrating an example of a processing operation of the processor in a node involved in response transfer processing.

FIG. 8 is a flowchart illustrating an example of a processing operation of the processor 15 in the node N2 involved in response transfer processing. In FIG. 8, the response deciding unit 35 in the processor 15 decides whether a content response has been received through the distributing unit 12A (step S21). If a content response has been received (the decision in step S21 is affirmative), the response deciding unit 35 references the request table 22 and decides whether the content response corresponds to the content request (step S22).

If the content response corresponds to the content request (the decision in step S22 is affirmative), the response deciding unit 35 references the transfer destination port in the relevant entry in the request table 22 and decides whether all content responses corresponding to the content request have been received (step S23).

If all content responses corresponding to the content request have been received (the decision in step S23 is affirmative), the response combining unit 36 in the processor 15 decides whether there is duplicated content in the received content responses (step S24). If there is no duplicated content (the decision in step S24 is negative), the response combining unit 36 combines the content and stores the combined content in a content response (step S25).

The response transferring unit 37 in the processor 15 references the request table 22, identifies a requesting port for the relevant entry involved in the content request, and requests the distributing unit 12A to transfer the content response to the identified requesting port (step S26). Furthermore, the table control unit 31 in the processor 15 deletes the entry involved in the content request from the request table 22 (step S27) and terminates the processing operation illustrated in FIG. 8.

If a content response has not been received (the decision in step S21 is negative) or the content response does not correspond to the content request (the decision in step S22 is negative), the response deciding unit 35 terminates the processing operation illustrated in FIG. 8. If all content responses corresponding to the content request have not been received (the decision in step S23 is negative), the response deciding unit 35 proceeds to step S21 and decides whether a content response has been received.

If there is duplicated content for the content request (the decision in step S24 is affirmative), the response combining unit 36 deletes the duplicated content to suppress a duplicated transfer to the transfer destination (step S28), after which the response combining unit 36 proceeds to step S25 to combine the remaining content and to store the combined content in a content response.

When the processor 15, which executes response transfer processing illustrated in FIG. 8, receives all content responses for the content request, the processor 15 decides whether there is duplicated content. If there is duplicated content, the processor 15 deletes the duplicated content, combines the remaining content, and stores the combined content in a content response. Furthermore, the processor 15 transfers the content response to the requesting port for the content request. As a result, the processor 15 can transfer a content response for the content request while suppressing a duplicated transfer of duplicated content.

If there is no duplicated content, the processor 15 combines content and stores the combined content in a content response, and transfers the content response to the requesting port for the content request. As a result, the processor 15 can transfer a content response for a content request.

Figure 9:
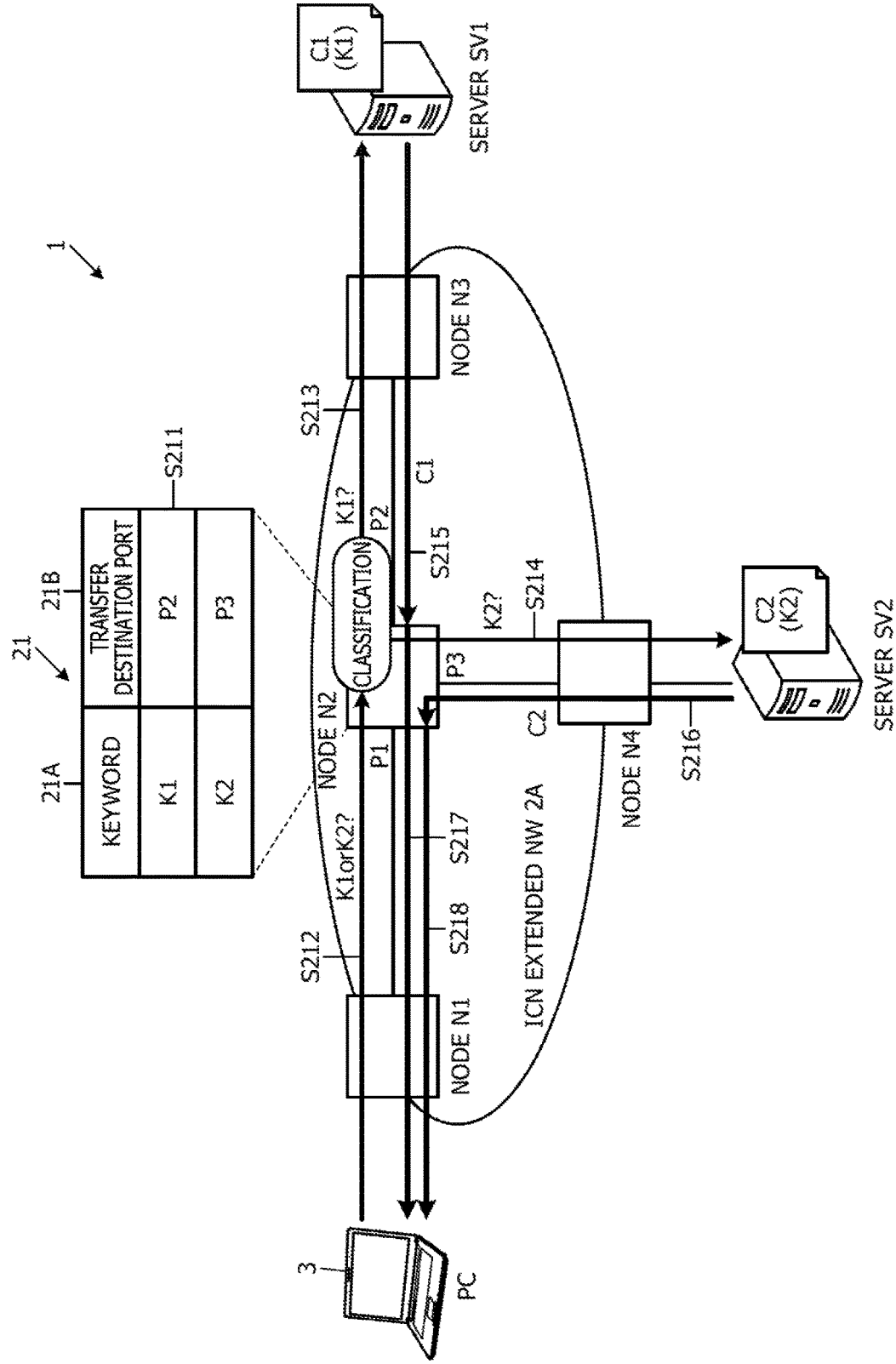
FIG. 9 is an explanatory diagram illustrating an example in which a keyword in a content request is classified.

FIG. 9 is an explanatory diagram illustrating an example in which a keyword in a content request is classified. It will be assumed that, in the communication system 1 illustrated in FIG. 9, content C1 is stored in the server SV1 and content C2 is stored in the server SV2. In the example in FIG. 9, for convenience of explanation, the combining policy 24 does not impose any restriction.

The server SV1 performs advertisement distribution of the keyword K1 related to the content C1 within the ICN extended NW 2A, and the server SV2 performs advertisement distribution of the keyword K2 related to the content C2 within the ICN extended NW 2A. The node N2 receives the keyword K1 coming from the server SV1 through the port P2 coupled to the node N3, and also receives the keyword K2 coming from the server SV2 through the port P3 coupled to the node N4. As a result, the node N2 registers, in the first route table 21, the port P2 in correspondence to the keyword K1 and port P3 in correspondence to the keyword K2 (step S211).

When the node N2 receives a content request (K1orK2?) including the keyword K1 or K2, the content request coming from the PC 3 of the user, through the port P1 (step S212), the node N2 references the classification policy 23 and classifies the keywords K1 and K2 in the content request. The node N2 references the first route table 21 and identifies the port P2 corresponding to the keyword K1. The node N2 transfers a content request (K1?) including the keyword K1 from the port P2 through the node N3 (step S213).

The node N2 references the first route table 21 and identifies the port P3 corresponding to the keyword K2. The node N2 transfers a content request (K2?) including the keyword K2 from the port P3 through the node N4 (step S214).

The server SV1 acquires the content C1 corresponding to the keyword K1 in response to the content request including the keyword K1, stores the content C1 in a content response, and transfers the content response to the node N2 through the node N3 (step S215). The server SV2 acquires the content C2 corresponding to the keyword K2 in response to the content request including the keyword K2, stores the content C2 in a content response, and transfers the content response to the node N2 through the node N4 (step S216).

When the node N2 receives the content response including the content C1, the content response coming from the server SV1, the node N2 transfers the content response including the content C1 to the requesting port for the content request (step S217). When the node N2 receives the content response including the content C2, the content response coming from the server SV2, the node N2 transfers the content response including the content C2 to the requesting port for the content request (step S218). The PC 3 of the user acquires, through the node N1, the content responses for the content C1 and C2 corresponding to the content request including the keyword K1. As a result, the user can acquire the content C1 and C2 related to the keywords K1 and K2 from the servers SV1 and SV2 within the ICN extended NW 2A in a batch.

Figure 10:
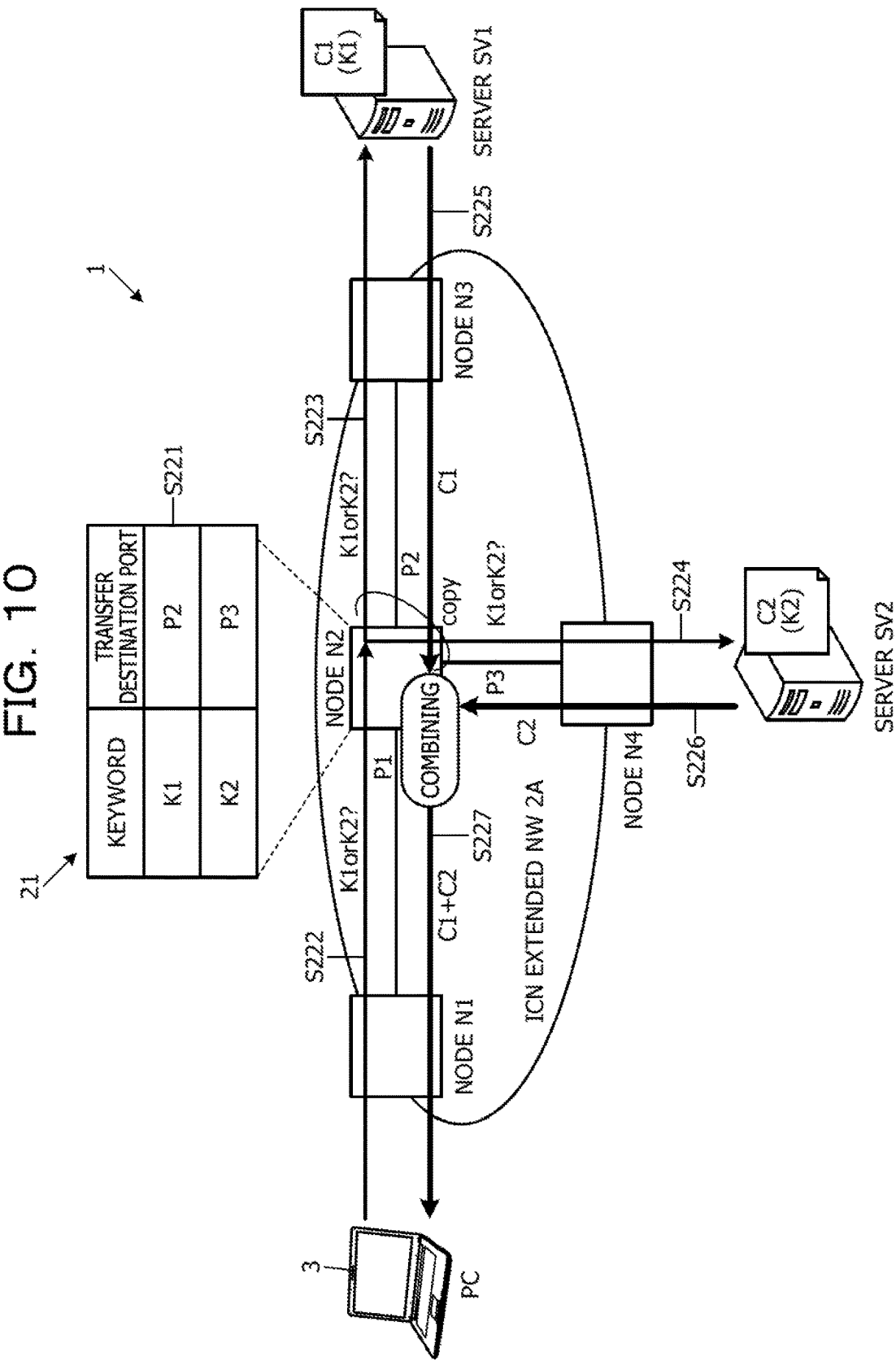
FIG. 10 is an explanatory diagram illustrating an example in which a keyword in a content request is not classified.

FIG. 10 is an explanatory diagram illustrating an example in which a keyword in a content request is not classified. It will be assumed that, in the communication system 1 illustrated in FIG. 10, content C1 is stored in the server SV1 and content C2 is stored in the server SV2. In the example in FIG. 10, for convenience of explanation, the classification policy 23 does not impose any restriction.

The server SV1 performs advertisement distribution of the keyword K1 related to the content C1 within the ICN extended NW 2A, and the server SV2 performs advertisement distribution of the keyword K2 related to the content C2 within the ICN extended NW 2A. The node N2 receives the keyword K1 coming from the server SV1 through the port P2 coupled to the node N3, and also receives the keyword K2 coming from the server SV2 through the port P3 coupled to the node N4. As a result, the node N2 registers, in the first route table 21, the port P2 in correspondence to the keyword K1 and port P3 in correspondence to the keyword K2 (step S221).

When the node N2 receives a content request (K1orK2?) including the keyword K1 or K2, the content request coming from the PC 3 of the user, through the port P1 (step S222), the node N2 extracts the keywords K1 and K2 in the content request. The node N2 references the first route table 21 and identifies the port P2 corresponding to the keyword K1 or K2. The node N2 transfers the content request (K1orK2?) including the keyword K1 or K2 from the port P2 through the node N3 (step S223).

The node N2 references the first route table 21 and identifies the port P3 corresponding to the keyword K1 or K2. The node N2 transfers the content request (K1orK2?) including the keyword K1 or K2 from the port P3 through the node N4 (step S224).

The server SV1 acquires the content C1 corresponding to the keyword K1 or K2 in response to the content request including the keyword K1 or K2, stores the content C1 in a content response, and transfers the content response to the node N2 through the node N3 (step S225). The server SV2 acquires the content C2 corresponding to the keyword K1 or K2 in response to the content request including the keyword K1 or K2, stores the content C2 in a content response, and transfers the content response to the node N2 through the node N4 (step S226).

The node N2 receives the content response including the content C1, the content response coming from the server SV1, and also receives the content response including the content C2, the content response coming from the server SV2. Furthermore, the node N2 references the combining policy 24 and stores the content C1 and C2 in a content response, and transfers the content response (C1+C2) from the requesting port P1 for the content request (step S227). The PC 3 of the user acquires, through the node N1, the content response, including content C1 and C2, which corresponds to the content request including the keyword K1 or K2. As a result, the user can acquire the content C1 and C2 related to the keywords K1 and K2 from the servers SV1 and SV2 within the ICN extended NW 2A in a batch. Furthermore, since the node N2 can transfer content with a single content response by combing content, a communication load on the node N2 can be reduced.

Figure 11:
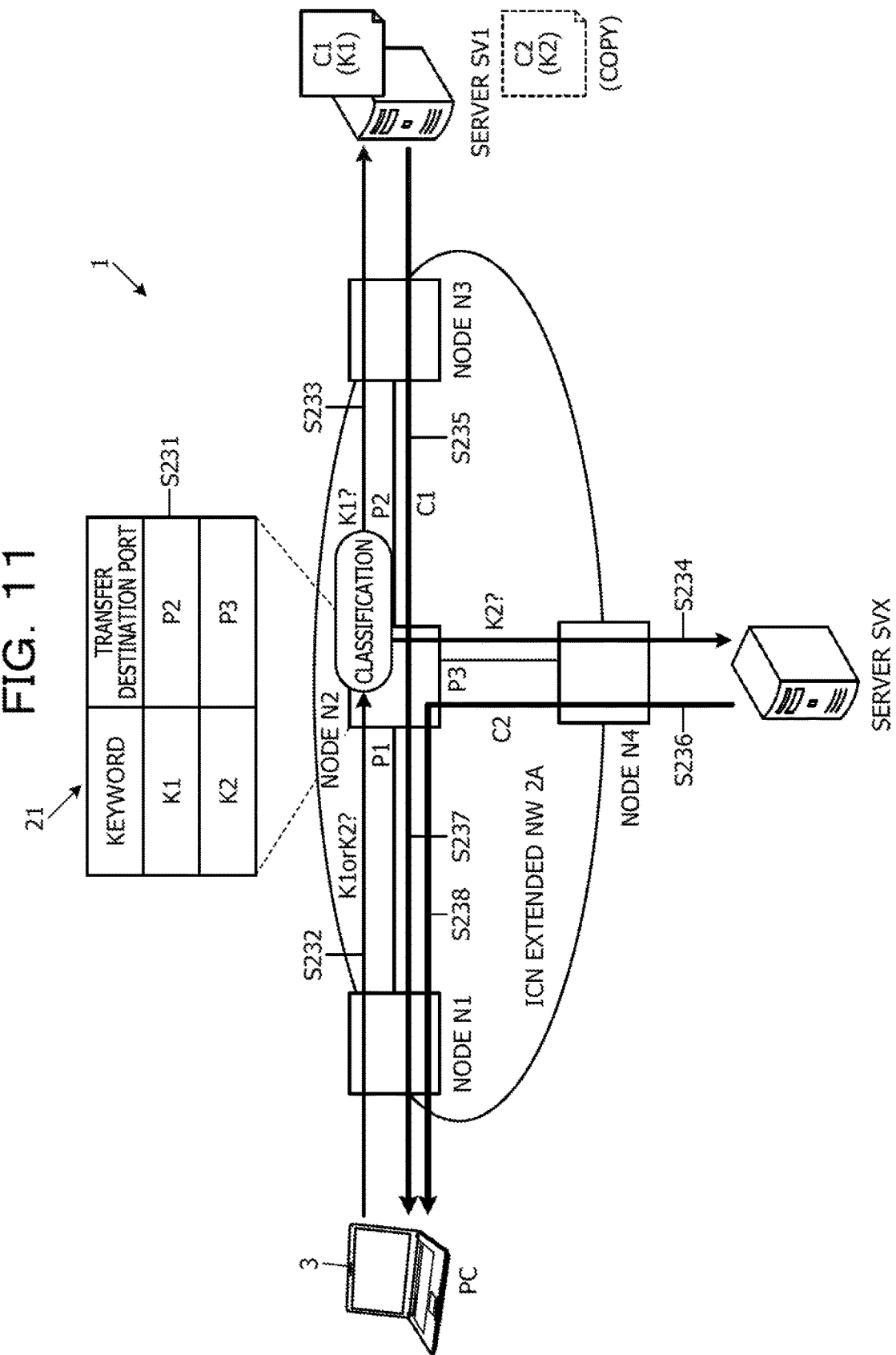
FIG. 11 is an explanatory diagram illustrating an example in which a keyword in a content request is classified.

FIG. 11 is an explanatory diagram illustrating an example in which a keyword in a content request is classified. It will be assumed that, in the communication system 1 illustrated in FIG. 11, content C1 is stored in the server SV1 and content C2 is stored in the server SV2. Furthermore, in the server SV1, the content C2 in the server SV2 is copied and cached.

The server SV1 performs advertisement distribution of the keyword K1 related to the content C1 within the ICN extended NW 2A, and the server SV2 performs advertisement distribution of the keyword K2 related to the content C2 within the ICN extended NW 2A. As a result, the node N2 registers, in the first route table 21, the port P2 in correspondence to the keyword K1 and port P3 in correspondence to the keyword K2 (step S231).

When the node N2 receives a content request (K1orK2?) including the keyword K1 or K2, the content request coming from the PC 3 of the user, through the port P1 (step S232), the node N2 extracts the keywords K1 and K2 in the content request. The node N2 classifies keywords into the keyword K1 and keyword K2. The node N2 then references the first route table 21 and identifies the port P2 corresponding to the keyword K1. The node N2 then transfers a content request including the keyword K1 from the port P2 through the node N3 (step S233).

The node N2 references the first route table 21 and identifies the port P3 corresponding to the keyword K2. The node N2 transfers a content request including the keyword K2 from the port P3 through the node N4 (step S234).

The server SV1 acquires the content C1 corresponding to the keyword K1 in response to the content request including the keyword K1, stores the content C1 in a content response, and transfers the content response to the node N2 through the node N3 (step S235). The server SV2 acquires the content C2 corresponding to the keyword K2 in response to the content request including the keyword K2, stores the content C2 in a content response, and transfers the content response to the node N2 through the node N4 (step S236).

When the node N2 receives the content response including the content C1, the content response coming from the server SV1, the node N2 transfers the content response including the content C1 to the requesting port P1 for the content request (step S237). When the node N2 receives the content response including the content C2, the content response coming from the server SV2, the node N2 transfers the content response including the content C2 to the requesting port P1 for the content request (step S238). The PC 3 of the user acquires, through the node N1, content responses, including content C1 and C2, which correspond to the content requests including the keywords K1 and K2.

As a result, the user can acquire the content C1 and C2 related to the keywords K1 and K2 from the servers SV1 and SV2 within the ICN extended NW 2A. Furthermore, the node N2 classifies a keyword in a content request; the node N2 classifies a content request including the keyword K1 as a content request for the server SV1. Therefore, it is possible to suppress duplicated reception of duplicated content C2 from, for example, the server SV1.

Without combining content responses for content requests including the classified keywords, the node N2 individually transfers these content responses to the PC 3. In this case, since content requests and content responses are not in a one-to-one correspondence, the next stage is asked to count the number of content responses and action is taken by, for example, waiting for a content response for a certain time.

Figure 12:
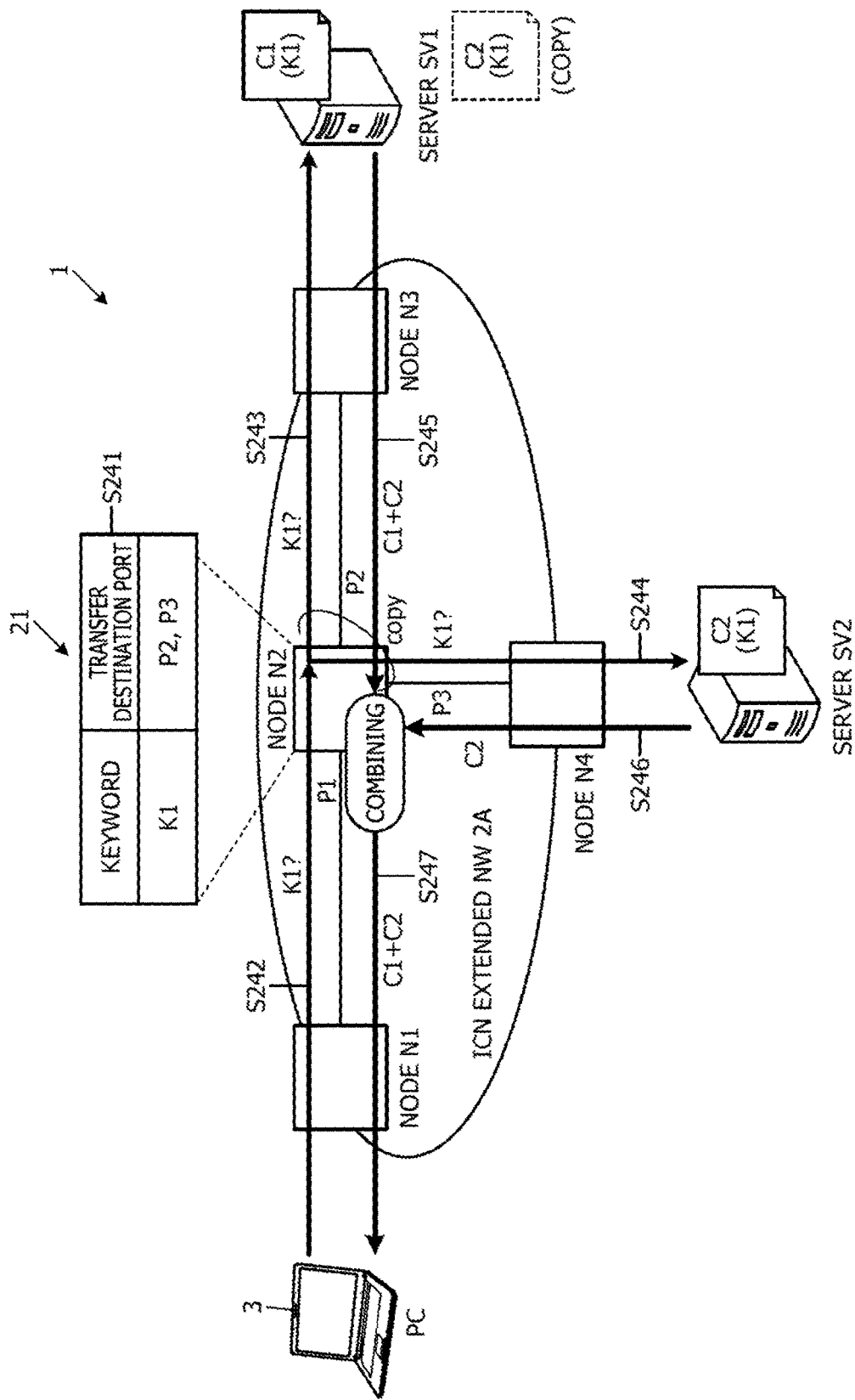
FIG. 12 is an explanatory diagram illustrating an example in which a keyword in a content request is not classified.

FIG. 12 is an explanatory diagram illustrating an example in which a keyword in a content request is not classified. It will be assumed that, in the communication system 1 illustrated in FIG. 12, content C1 is stored in the server SV1 and content C2 is stored in the server SV2. Furthermore, in the server SV1, the content C2 in the server SV2 is copied and cached.

The server SV1 performs advertisement distribution of the keyword K1 related to the content C1 within the ICN extended NW 2A, and the server SV2 performs advertisement distribution of the keyword K1 related to the content C2 within the ICN extended NW 2A. As a result, the node N2 registers the port P2 and port P3 in the first route table 21 in correspondence to the keyword K1 (step S241).

When the node N2 receives a content request (K1?) including the keyword K1, the content request coming from the PC 3 of the user, through the port P1 (step S242), the node N2 extracts the keyword K1 in the content request. The node N2 then references the first route table 21 and identifies the ports P2 and P3 corresponding to the keyword K1. The node N2 then transfers the content request including the keyword K1 from the port P2 through the node N3 (step S243). Furthermore, the node N2 transfers the content request including the keyword K1 from the port P3 through the node N4 (step S244).

The server SV1 acquires the content C1 and C2 corresponding to the keyword K1 in response to the content request including the keyword K1, stores the content C1 and C2 in a content response, and transfers the content response to the node N2 through the node N3 (step S245). The server SV2 also acquires the content C2 corresponding to the keyword K1 in response to the content request including the keyword K1, stores the content C2 in a content response, and transfers the content response to the node N2 through the node N4 (step S246).

The node N2 receives the content response including content C1 and C2, the content response coming from the server SV1, and also receives the content response including the content C2, the content response coming from the server SV2. Since the content C2 is duplicated, the node N2 deletes one of the duplicated pieces of content C2, combines the other content C2 and content C1 together, stores the combined content in a content response, and transfers the content response from the requesting port P1 for the content request (step S247). The PC 3 acquires, through the node N1, the content response including the content C1 and C2 corresponding to the content request including the keyword K1. As a result, the user can acquire the content C1 and C2 related to the keyword K1 from the servers SV1 and SV2 within the ICN extended NW 2A in a batch. In addition, since the node N2 deletes the duplicated content C2, it is possible to suppress wasteful transfer of duplicated content C2 to the node N1 and thereby to reduce the amount of communication.

In the first embodiment, neither a search server nor a DNS server is used at the time of requesting content, and the number of messages, such as content requests and content responses, and the amount of data, the messages and data being used in communication on the ICN extended NW 2A, can be reduced.

In related art, a PC plays a central role in accessing a search server and a DNS server to individually collect content. Therefore, the PC becomes a bottleneck in processing. In contrast, in the first embodiment, processing for content requests and content responses are distributed to different nodes N, so the PC 3 does not easily become a bottleneck in processing and improvement of scalability can be expected. In particular, when the combining policy 24 for content responses is used to perform a computation among content to obtain, for example, the maximum value, minimum value, average, or the like, the effect of scalability improvement due to the reduction of the amount of data and the distribution of processing (the combining of content responses) is large.

In related art, crawling by a search server and messages in IP advertisement are involved at the time of preparation, and when content is requested, messages such as a content request and content responses are involved at the search server and DNS server. In contrast, in the first embodiment, messages in keyword advertisement are involved at the time of preparation, and when content is requested, messages such as a content request and content responses are involved. That is, in this embodiment, messages to the search server and DNS server are not used. In addition, the numbers of content requests and content responses can be reduced. At the time of preparation as well, a small relative number of messages is sufficient, so a reduction in the number of messages can be achieved.

In the first embodiment, it is possible to achieve the specification of a keyword and the identification and acquisition of content with a single action without the intervention of the PC 3, and a plurality of pieces of content can be acquired with a content response in a batch.

In the first embodiment, it is possible to reduce the number of content response messages by classifying keywords in content requests and suppressing the reception of potential duplicated content and to reduce the amount of communication by excluding the reception of duplicated content.

In the first embodiment, it is possible to reduce the number of content response messages by combining a plurality of content responses and to reduce the amount of communication by excluding duplicated content.

In the first embodiment, since processing to classify keywords in content requests and processing to combine content responses are distributed and executed in a cascading manner. Therefore, unlike a case in which a PC executes processing in a concentrated manner as before, it is possible to achieve a large-scale batch search for content within the ICN extended NW 2A.

Incidentally, in the communication system 1 in the first embodiment described above, the numbers of PCs 3, nodes N1 to N4, and servers SV1 and SV2 are not limited to the example illustrated in FIG. 1; these numbers can be appropriately changed.

Second Embodiment

Figure 13:
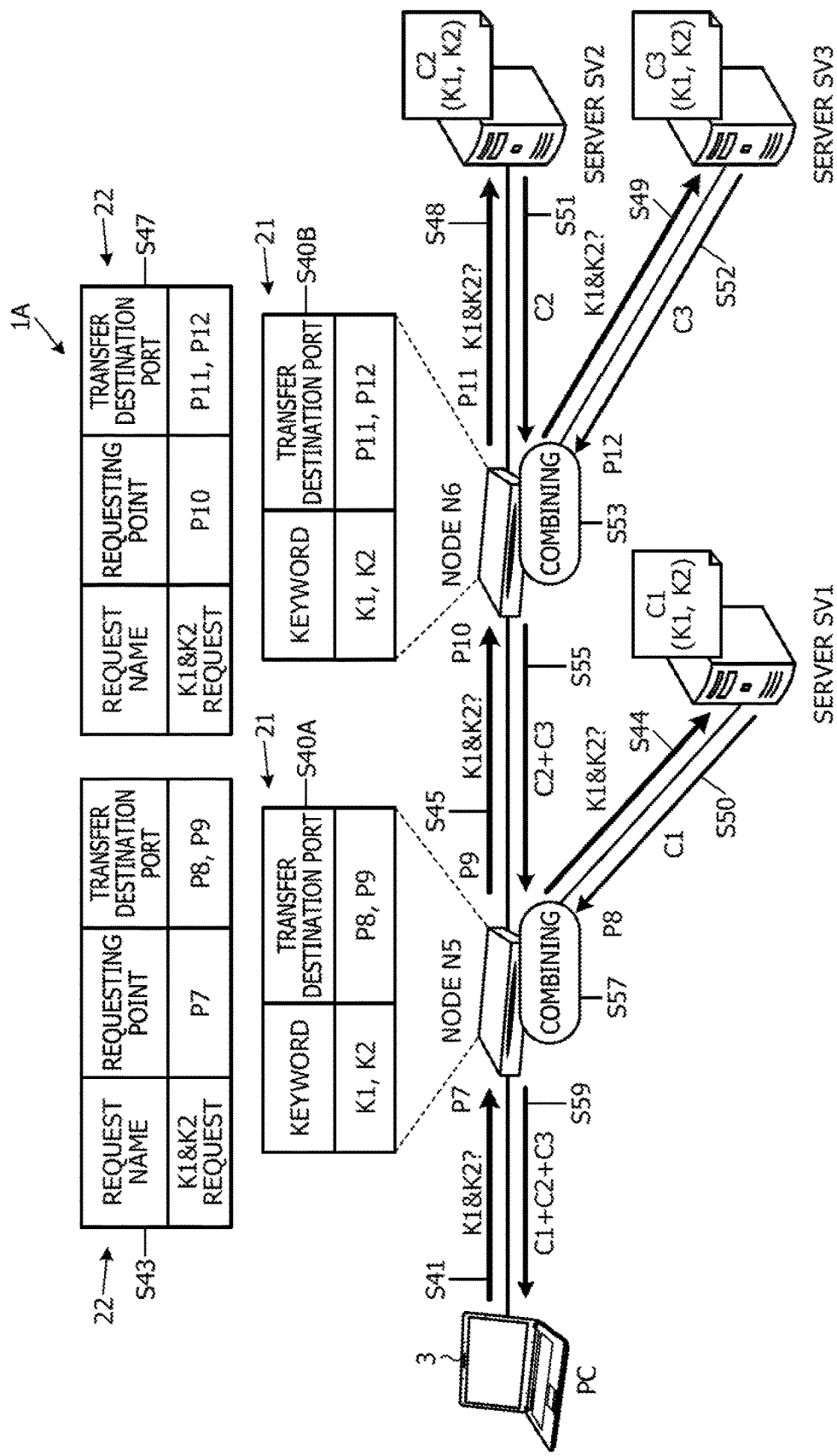
FIG. 13 is an explanatory diagram illustrating an example of a communication system in a second embodiment.
Figure 14:
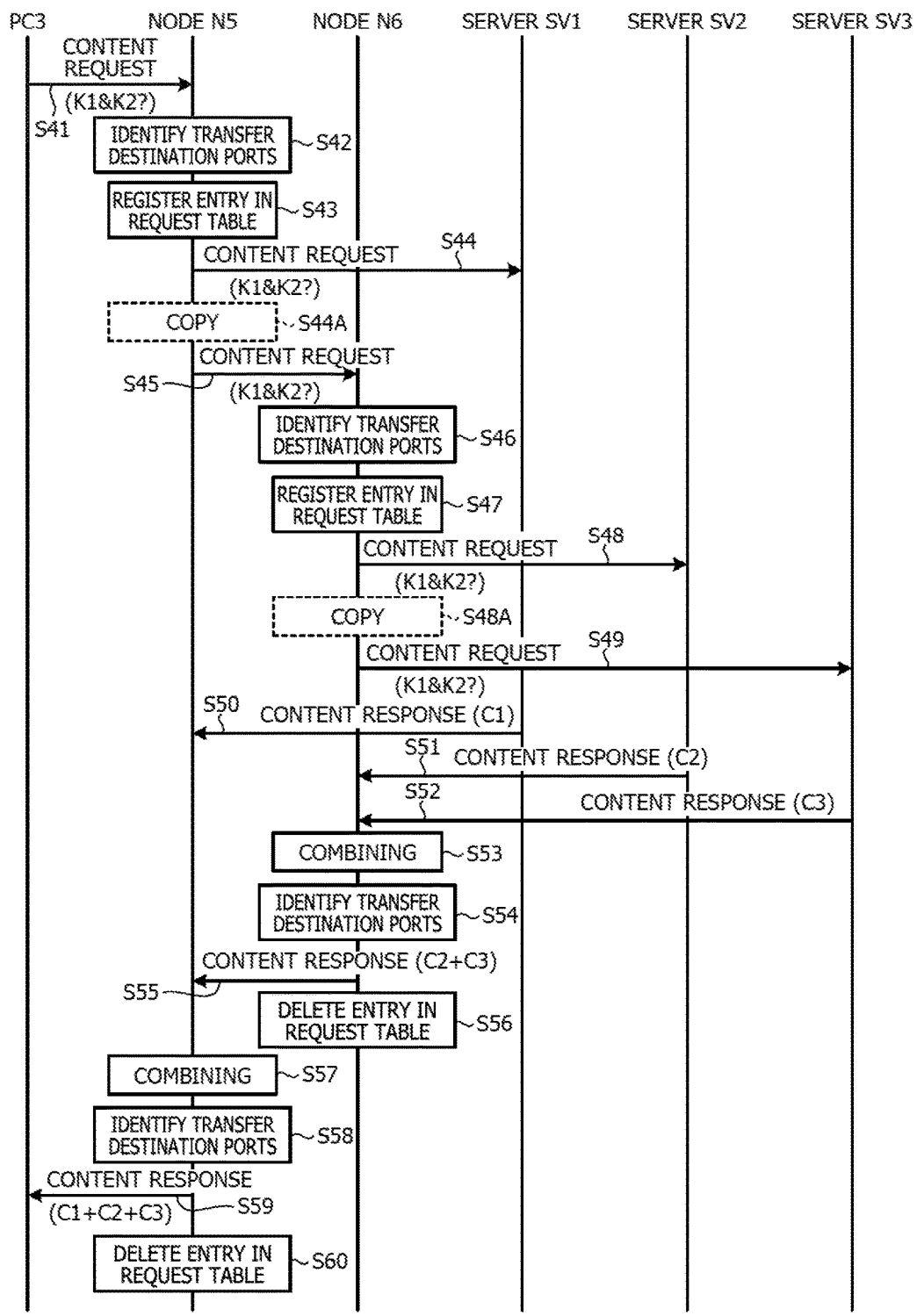
FIG. 14 is a timing diagram illustrating an example of a processing operation of the communication system from a content request to a content response.

FIG. 13 is an explanatory diagram illustrating an example of a communication system 1A in a second embodiment. FIG. 14 is a timing diagram illustrating an example of a processing operation of the communication system 1A from a content request to a content response. Incidentally, component elements that are the same as in the communication system 1 in the first embodiment will be denoted by the same reference numerals and the descriptions of duplicated constituent elements and operations will be omitted. The communication system 1A illustrated in FIG. 13 has the PC 3, a node N5, a node N6, and servers SV1 to SV3. Incidentally, the nodes N5 and N6 have the same structure as the node N2. The node N5 is coupled to a line between the node N5 and the PC 3 at a port P7, a line between the node N5 and the server SV1 at a port P8, and a line between the node N5 and the node N6 at a port P9. Furthermore, the node N6 is coupled to a line between the node N6 and the node N5 at a port P10, a line between the node N6 and the server SV2 at a port P11, and a line between the node N6 and the server SV3 at a port P12.

The server SV1 stores content C1 including the keywords K1 and K2 and enables the content C1 to be provided. The server SV2 stores content C2 including the keywords K1 and K2 and enables the content C2 to be provided. The server SV3 stores content C3 including the keywords K1 and K2 and enables the content C3 to be provided.

It will be assumed that the ports P8 and P9 are registered in the first route table 21 in the node N5 in correspondence to the keywords K1 and K2 (step S40A). It will be assumed that the ports P11 and P12 are registered in the first route table 21 in the node N6 in correspondence to the keywords K1 and K2 (step S40B).

The PC 3 of the user transfers a content request (K1&K2?) including the keywords K1 and K2 to the node N5 to request it to acquire content including the keywords K1 and K2. When the node N5 receives the content request (K1&K2?) including the keywords K1 and K2 (step S41), the node N5 extracts the keywords K1 and K2 in the content request. The node N5 references the first route table 21 and identifies the transfer destination ports P8 and P9 corresponding to the keywords K1 and K2 (step S42). Furthermore, the node N5 registers, as an entry, the requesting port P7 for the content request and the transfer destination ports P8 and P9 in the request table 22 in correspondence to a request name (K1&K2 request) in the content request including the keywords K1 and K2 (step S43). Then, the node N5 transfers the content request (K1&K2?) including the keywords K1 and K2 from the transfer destination port P8 to the server SV1 (step S44). The node N5 copies the content request (K1&K2?) including the keywords K1 and K2 (step S44A) and transfers the copied content request from the transfer destination port P9 to the node N6 (step S45).

When the node N6 receives the content request (K1&K2?) including the keywords K1 and K2 in step S45, the node N6 extracts the keywords K1 and K2 in the content request. The node N6 references the first route table 21 and identifies the transfer destination ports P11 and P12 corresponding to the keywords K1 and K2 (step S46). Furthermore, the node N6 registers, as an entry, the requesting port P10 for the content request and the transfer destination ports P11 and P12 in the request table 22 in correspondence to a request name (K1&K2 request) in the content request including the keywords K1 and K2 (step S47). Then, the node N6 transfers the content request including the keywords K1 and K2 from the transfer destination port P11 to the server SV2 (step S48). The node N6 copies the content request (step S48A) and transfers the copied content request from the transfer destination port P12 to the server SV3 (step S49).

When the server SV1 receives the content request including the keywords K1 and K2 in step S44, the server SV1 stores the content C1 including the keywords K1 and K2 in a content response and returns the content response to the node N5 (step S50). When the server SV2 receives the content request including the keywords K1 and K2 in step S48, the server SV2 stores the content C2 including the keywords K1 and K2 in a content response and returns the content response to the node N6 (step S51). When the server SV3 receives the content request including the keywords K1 and K2 in step S49, the server SV3 stores the content C3 including the keywords K1 and K2 in a content response and returns the content response to the node N6 (step S52).

When the node N6 receives the content response including the content C2 and the content response including the content C3, the node N6 combines the content C2 and C3 together and stores the combined content in a content response (step S53). Furthermore, the node N6 references the request table 22 and identifies the requesting port P10 as the transfer destination port for the content response (step S54). Furthermore, the node N6 transfers the content response from the identified transfer destination port P10 (step S55). The node N6 then deletes the entry with the request name "K1&K2 request" in the request table 22 (step S56).

When the node N5 receives the content response including the content C1, the content response coming from the server SV1, and the content response including the content C2 and C3, the content response coming from the node N6, the node N5 combines content C1, C2, and C3 together and stores the combined content in a content response (step S57). Furthermore, the node N5 references the request table 22 and identifies the requesting port P7 as the transfer destination port for the content response (step S58). The node N5 transfers the content response including the content C1, C2, and C3 from the identified transfer destination port P7 (step S59). The node N5 then deletes the entry with the request name "K1&K2 request" in the request table 22 (step S60).

As a result, the PC 3 can receive the content response from the node N5 and can acquire the content C1, C2, and C3 in a batch.

When the node N5 in the communication system 1A in the second embodiment receives a content request with "K1&K2 request" from the PC 3, the node N5 references the first route table 21 and transfers the content request to the node N6 and server SV1. Furthermore, when the node N5 receives a content request, the node N5 references the first route table 21 and transfers the content request to the servers SV2 and SV3. When the node N6 receives content responses for the content request from the servers SV2 and SV3, the node N6 references the request table 22, combines content in the content responses, and transfers the combined content response to the node N5. Furthermore, when the node N5 receives a content response for a content request from the server SV1 and also receives a content response from the node N6, the node N5 references the request table 22 and transfers a content response in which content is combined to the PC 3. As a result, the PC 3 can acquire the content C1, C2, and C3 from the ICN extended NW 2A in a batch by using the keywords K1 and K2 as the search keys.

Although, a port or ports have been stored in the first route table 21 in the first and second embodiments for each keyword or a keyword combination, a single port or a plurality of ports may be stored. Although a requesting port and a transfer destination port or transfer destination ports have been stored in the request table 22 in the first and second embodiments for each content request, a single transfer destination port or a plurality of transfer destination ports may also be stored.

In the first and second embodiments described above, all content that includes the keyword specified in a content request is collected from the servers SV1 and SV2 within the ICN extended NW 2A, after which the collected content is combined into a single content response and the combined content response is transferred to the PC 3. If, however, the keyword is a general term, the content request is transferred infinitely within the ICN extended NW 2A, resulting in a huge number of pieces of content in the content response. Therefore, a limit is imposed on the number of responses (a restriction is added) to avoid this situation. For example, an upper limit of the number of pieces of content to be combined in a content response may be determined, and domains and the number of hops that are used to send content requests may be restricted within a certain range to suppress as many pieces of content as the upper limit or more pieces of content from being collected or compiled.

Although the nodes N1 to N6 in the first and second embodiments described above have been applied to the ICN extended NW 2A and have used the first route table 21, in which the keyword 21A and port 21B are managed in correspondence to each other, this is not a limitation. The network is not limited to the ICN extended NW 2A. An embodiment of a communication system that enables keyword-based content search without changing the structures of nodes on an ICN NW 2 will be described below as a third embodiment.

Third Embodiment

Figure 15:
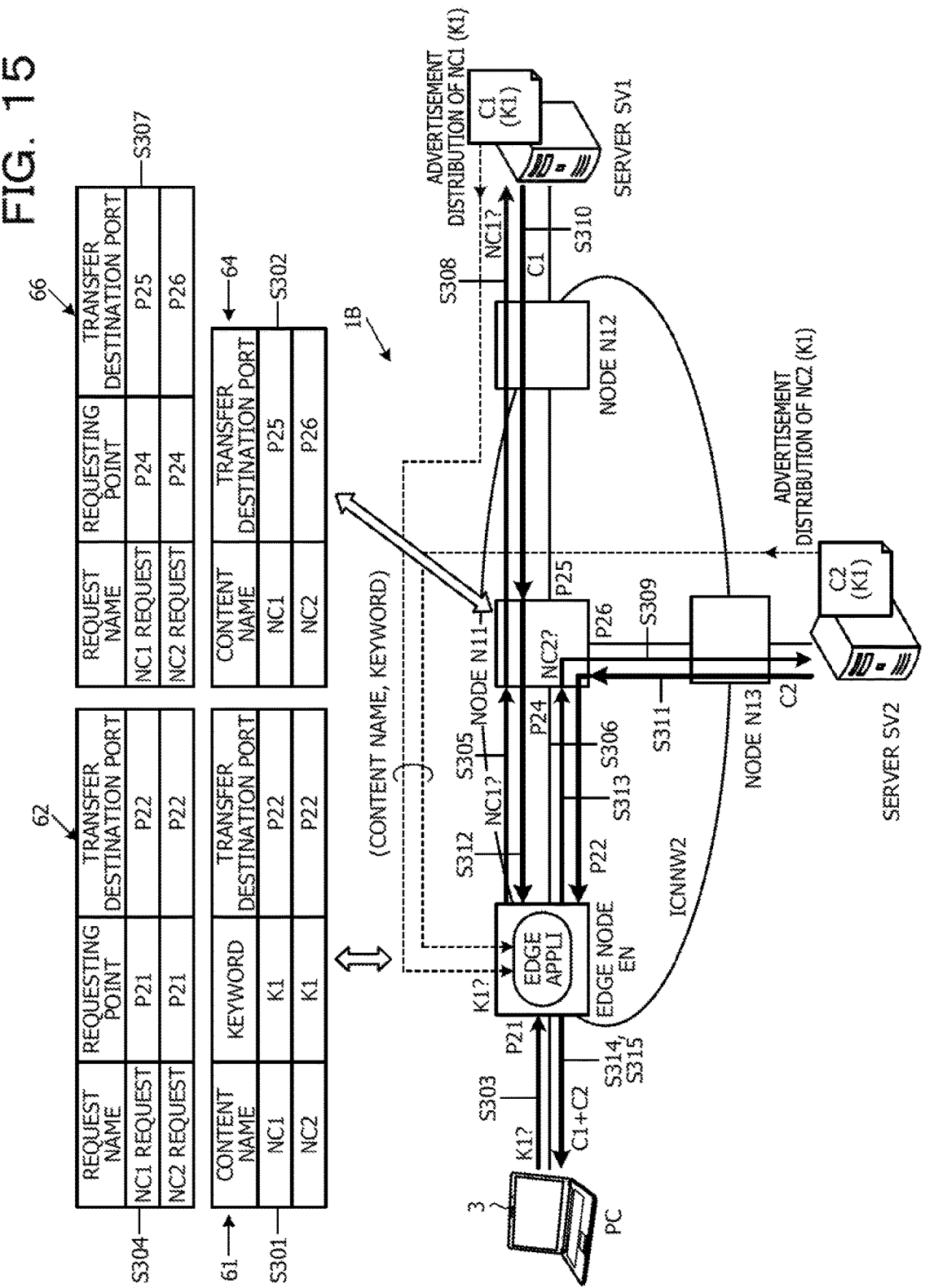
FIG. 15 is an explanatory diagram illustrating an example of a communication system in a third embodiment.

FIG. 15 is an explanatory diagram illustrating an example of a communication system 1B in a third embodiment. Incidentally, the communication system 1B differs from the communication system 1 in the first embodiment in that keyword-based content search is possible without changing the structures of nodes N11, N12, and N13 on the ICN NW 2 used instead of the ICN extended NW 2A. The communication system 1B illustrated in FIG. 15 has the PC 3, an edge node EN, a plurality of nodes N11, N12, and N13, and a plurality of servers SV1 and SV2. The edge node EN and the plurality of nodes N11, N12, and N13 are mutually coupled through the ICN NW 2.

The server SV1 stores content C1 including the keyword K1. Incidentally, the content name of the content C1 is, for example, NC1. The server SV2 stores content C2 including the keyword K1. Incidentally, the content name of the content C2 is, for example, NC2. The server SV1 performs advertisement distribution of the keyword K1 and the content name NC1 within the ICN NW 2. The server SV2 performs advertisement distribution of the keyword K1 and the content name NC2 within the ICN NW 2. The nodes N11, N12, and N13 within the ICN NW 2 register a transfer destination port 64B in a third route table 64 for each content name 64A in correspondence to each other.

When the edge node EN receives an advertisement distribution of the keyword K1 and the content name NC1, the advertisement distribution coming from the server SV1, the edge node EN registers the keyword K1, the content name NC1, and the port P22, which has received the keyword and content name, in a second route table 61 in correspondence to one another. When the edge node EN receives an advertisement distribution of the keyword K1 and the content name NC2, the advertisement distribution coming from the server SV2, the edge node EN registers the keyword K1, the content name NC2, and the port P22, which has received the keyword and content name, in a second route table 61 in correspondence to one another.

Figure 16:
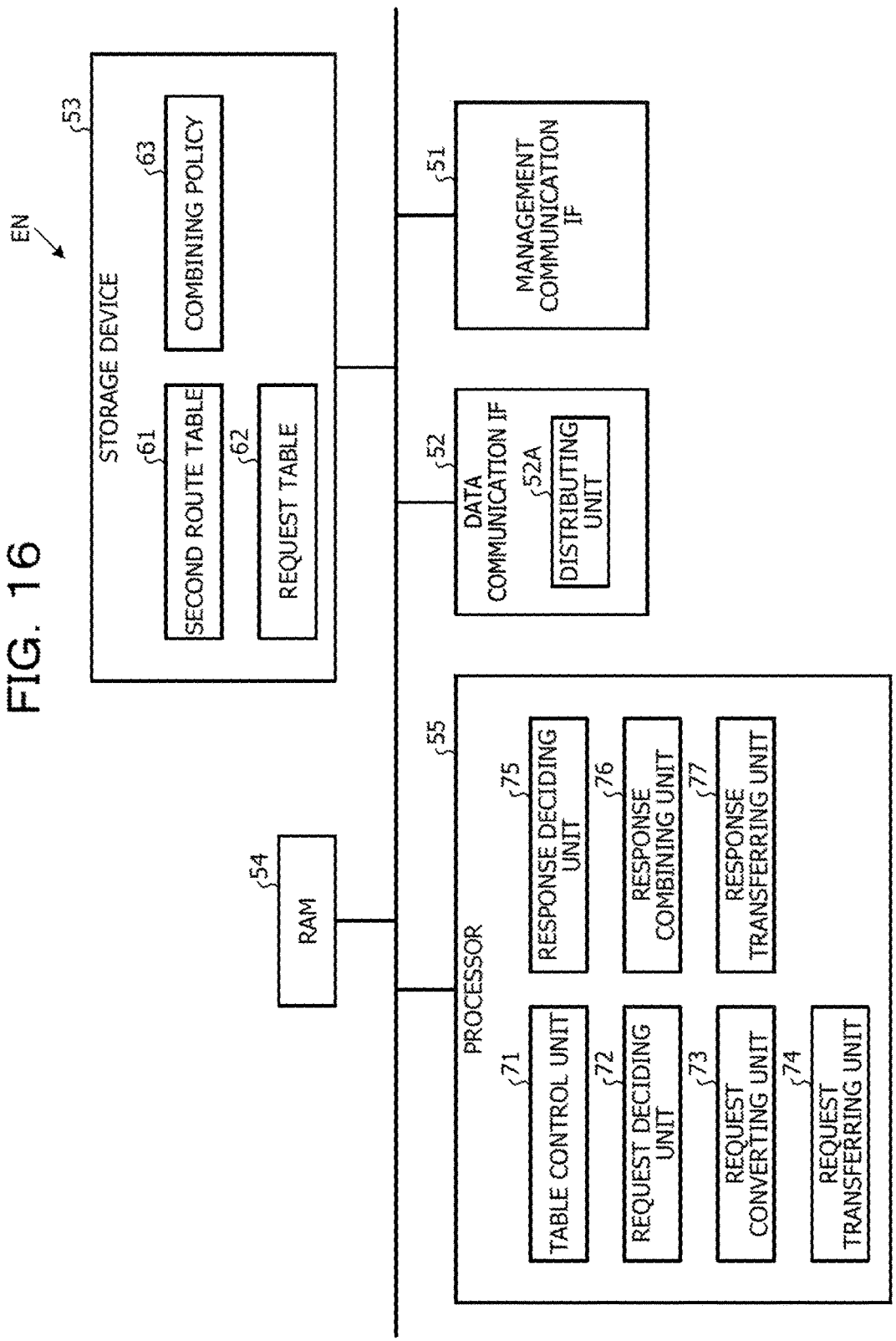
FIG. 16 is an explanatory diagram illustrating an example of the structure of an edge node.

FIG. 16 is an explanatory diagram illustrating an example of the structure of the edge node EN. The edge node EN illustrated in FIG. 16 has a management communication IF 51, a data communication IF 52, a storage device 53, a RAM 54, and a processor 55. The management communication IF 51 is a communication IF that controls communication with a management terminal (not illustrated) that manages the edge node EN. The data communication IF 52 is a communication IF that controls data communication with lines within the ICN NW 2. Incidentally, the data communication IF 52 has a plurality of ports P coupled on a per line basis and a distributing unit 52A, which receives data coming from each port P and distributes data to each port P. The storage device 53 is an area in which various types of information is stored. The RAM 54 is a work area for processes executed by the processor 55. The processor 55 controls the whole of the edge node EN.

Figure 17:
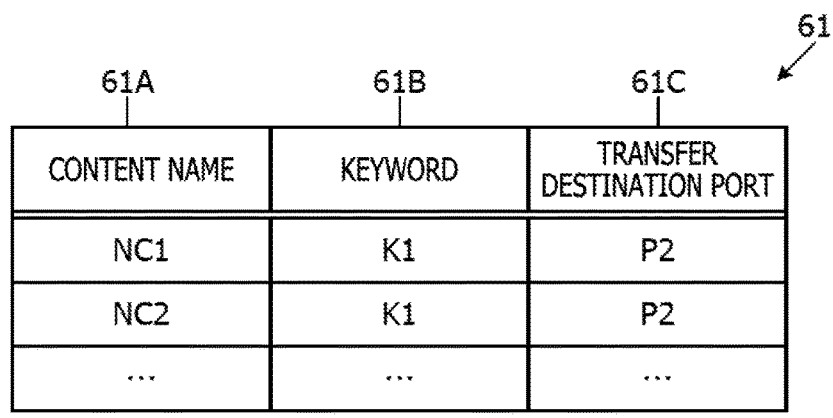
FIG. 17 is an explanatory diagram illustrating an example of the table structure of a second route table.

The storage device 53 has a second route table 61, a request table 62, and a combining policy 63. FIG. 17 is an explanatory diagram illustrating an example of the table structure of the second route table 61. The second route table 61 illustrated in FIG. 17 is a table that stores, in correspondence to content names 61A and keywords 61B received from the servers SV1 and SV2 in advertisement distribution, ports 61C that has received these keywords and content names.

Figure 18:
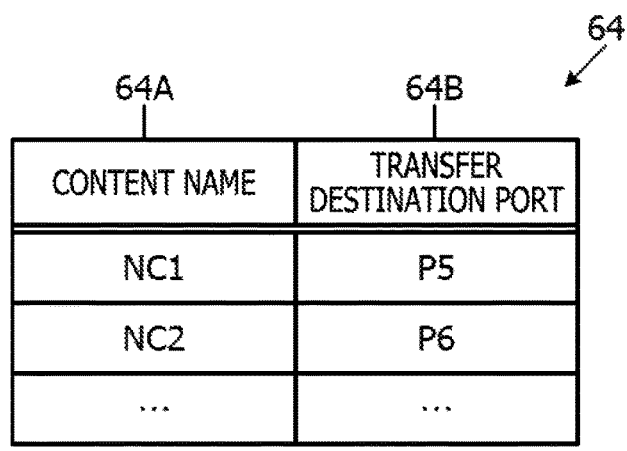
FIG. 18 is an explanatory diagram illustrating an example of the table structure of a third route table.

FIG. 18 is an explanatory diagram illustrating an example of the table structure of the third route table 64. Incidentally, the third route table 64 is possessed by the nodes N11, N12, and N13. The third route table 64 illustrated in FIG. 18 is a table that stores the content name 64A and transfer destination port 64B in correspondence to each other. The nodes N11, N12, and N13 register content names received in advertisement distribution coming from the servers SV1 and SV2 in the third route table 64, and also register ports that have received the content names as transfer destination ports therein.

The processor 55 in the edge node EN loads an edge appli program stored in the storage device 53 into the RAM 54 and executes a process corresponding to the edge appli as a processing function. As processing functions, the processor 55 has a table control unit 71, a request deciding unit 72, a request converting unit 73, a request transferring unit 74, a response deciding unit 75, a response combining unit 76, and a response transferring unit 77.

The table control unit 71 controls storage in the second route table 61 and request table 62. When the table control unit 71 receives advertisement distributions, coming from the servers SV1 and SV2, of keywords and content names, the table control unit 71 registers, for each keyword and content name, these keywords as well as ports that have received these content names, in the second route table 61. When the table control unit 71 receives a content request, the table control unit 71 registers, for each request name 62A that identifies a content request, a requesting port 62B that has received the content request and a transfer destination port 62C to which the content request has been transferred in the request table 62 in correspondence to each other.

When the request deciding unit 72 receives data through the distributing unit 52A in the data communication IF 52, the request deciding unit 72 decides whether the received data is a content request. Incidentally, the request deciding unit 72 references the request name at the front of the content request and decides whether the received data is a content request. If the received data is a content request, the request converting unit 73 references the second route table 61 and converts the content request including a keyword to a content request with a content name corresponding to the keyword. The request transferring unit 74 identifies, from the second route table 61, the transfer destination port corresponding to the content name in the content request. Furthermore, the request transferring unit 74 requests the distributing unit 52A to transfer the content request with the content name after the conversion to the identified transfer destination port.

When the content request after the conversion is transferred, the table control unit 71 registers the content name that identifies the content request in the request table 62 in correspondence to the transfer destination port that has received the content request and the transfer destination port for the content request.

When the response deciding unit 75 receives data through the distributing unit 52A, the response deciding unit 75 decides whether the received data is a content request. Incidentally, the response deciding unit 75 references the request table 62 and decides whether the received data is a content request depending on whether the relevant request name is present in the content response. The response combining unit 76 references the request table 62 and decides whether a content response has been received from the transfer destination port for the content request.

When the response combining unit 76 receives content requests from all transfer destination ports, the response combining unit 76 decides whether there is duplicated content according to the combining policy 63. The response combining unit 76 deletes duplicated content, combines each piece of content, and stores the combined content in a content response. The response transferring unit 77 references the request table 62 and identifies a requesting port corresponding to a request name that identifies a content request involved in the content response. Furthermore, the response transferring unit 77 requests the distributing unit 52A to transfer the content response to the identified requesting port. When the content response is transferred, the table control unit 71 deletes, from the request table 62, the entry corresponding to the request name involved in the content request for the content response.

Next, operations of the communication system 1B in the third embodiment will be described. First, an operation of the communication system 1B will be descried that is performed when the user acquires content C1 and C2 that include the keyword K1 by using the PC 3. It will be assumed that, in the communication system 1B illustrated in FIG. 15, the content C1 is stored in the server SV1 and the content C2 is stored in the server SV2. Furthermore, it will be assumed that the server SV1 is coupled to the node N12 and the server SV2 is coupled to the node N13. The node N11 couples a line between the node N11 and the edge node EN at a port P24, couples a line between the node N11 and the node N12 at a port P25, and couples a line between the node N11 and the node N13 at a port P26.

The server SV1 performs advertisement distribution of the keyword K1 related to the content C1 and the content name NC1 within the ICN NW 2. The server SV2 performs advertisement distribution of the keyword K1 related to the content C2 and the content name NC2 within the ICN NW 2. The edge node EN receives the keyword K1 and content name NC1, which come from the server SV1, through the transfer destination port P22 coupled to the node N11, and also receives the keyword K1 and content name NC2, which come from the server SV2, through the port P22 coupled to the node N11. As a result, the edge node EN registers the content name 61A, keyword 61B, and transfer destination port 61C in the second route table 61 in correspondence to one another (step S301). The node N11 registers the content name 64A and transfer destination port 64B in the third route table 64 in correspondence to each other (step S302).

When the edge node EN receives a content request (K1?) including the keyword K1, the content request coming from the PC 3 of the user, through the port P21 (step S303), the edge node EN extracts the keyword K1 included in the content request. The edge node EN references the second route table 61 and identifies the content name NC1 and content name NC2 corresponding to the keyword K1. The edge node EN references the second route table 61 and identifies the transfer destination port P22 corresponding to the identified content name NC1. The edge node EN references the second route table 61 and identifies the transfer destination port P22 corresponding to the identified content name NC2. Then, the edge node EN registers the requesting port P21 and transfer destination port P22 in the request table 62 in correspondence to the request name "NC1 request" of the content request with the content name NC1 (step S304). Furthermore, the edge node EN registers the requesting port P21 and transfer destination port P22 in the request table 62 in correspondence to the request name "NC2 request" of the content request with the content name NC2.

The edge node EN converts the content request including a keyword to a content request (NC1?) with the content name NC1, and transfers the converted content request with the content name NC1 to the transfer destination port P22 (step S305). Furthermore, the edge node EN converts the content request including a keyword to a content request (NC2?) with the content name NC2, and transfers the converted content request with the content name NC2 to the transfer destination port P22 (step S306).

When the node N11 receives the content request (NC1?) with the content name NC1, the node N11 references the third route table 64 and identifies the transfer destination port P25 corresponding to the content name NC1. Furthermore, when the node N11 receives the content request (NC2?) with the content name NC2, the node N11 references the third route table 64 and identifies the transfer destination port P26 corresponding to the content name NC2. Then, the node N11 registers the requesting port P24 and transfer destination port P25 in the request table 62 in correspondence to the request name (NC1 request) of the content request (step S307). Furthermore, the node N11 registers the requesting port P24 and transfer destination port P26 in the request table 62 in correspondence to the request name (NC2 request) of the content request.

The node N11 transfers the content request (NC1?) with the content name NC1 from the identified transfer destination port P25 (step S308). The node N11 transfers the content request (NC2?) with the content name NC2 from the identified transfer destination port P26 (step S309).

When the server SV1 receives the content request with the content name NC1, the server SV1 acquires the content C1 corresponding to the content name NC1, stores the content C1 in a content response, and transfers the content response through the node N12 to the node N11 (step S310). When the server SV2 receives the content request with the content name NC2, the server SV2 acquires the content C2 corresponding to the content name NC2, stores the content C2 in a content response, and transfers the content response through the node N13 to the node N11 (step S311).

When the node N11 receives the content response including the content C1 corresponding to the content request (NC1?), the node N11 references a request table 66 and transfers the content response including the content C1 to the requesting port P24 (step S312). When the node N11 receives the content response including the content C2 corresponding to the content request (NC2?), the node N11 references the request table 66 and transfers the content response including the content C2 to the requesting port P24 (step S313). Incidentally, the node N11 deletes the entries for the content requests (NC1?) and (NC2?) in the request table 66.

When the edge node EN receives the content response including the content C1, the edge node EN references the request table 62 and transfers the content response including the content C1 to the requesting port P21 (step S314). Furthermore, when the edge node EN receives the content response including the content C2, the edge node EN references the request table 62 and transfers the content response including the content C2 to the requesting port P21 (step S315). Incidentally, the edge node EN deletes the entries for "NC1 request" and "NC2 request" involved in content requests in the request table 62. As a result, the PC 3 can receive the content response including the content C1 for the content request with the content name NC1 and can acquire the content C1. The PC 3 can receive the content response including the content C2 for the content request with the content name NC2 and can acquire the content C2.

Figure 19:
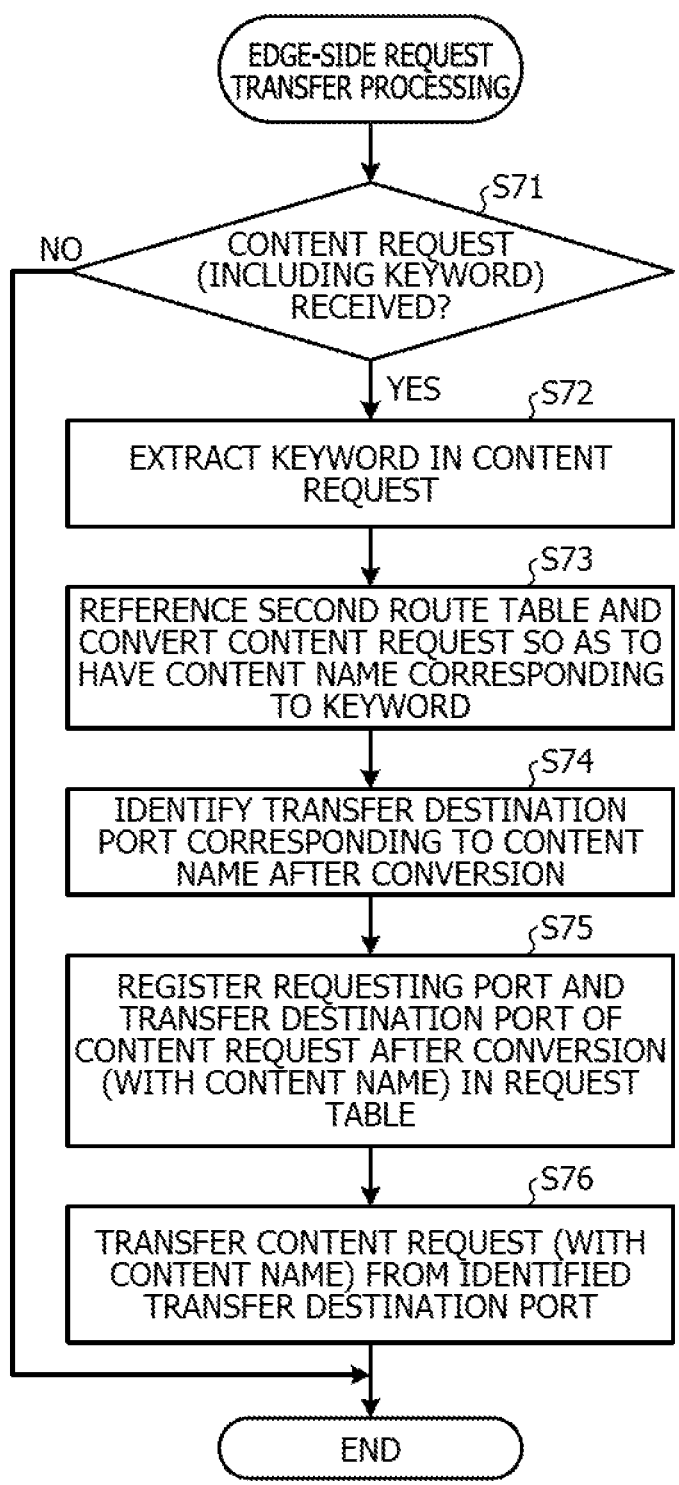
FIG. 19 is a flowchart illustrating an example of a processing operation of the processor in the edge node involved in edge-side request transfer processing.

FIG. 19 is a flowchart illustrating an example of a processing operation of the processor 55 in the edge node EN involved in edge-side request transfer processing. In FIG. 19, the request deciding unit 72 in the processor 55 in the edge node EN decides whether a content request including a keyword has been received (step S71). If a content request including a keyword has been received (the decision in step S71 is affirmative), the request converting unit 73 in the processor 55 extracts the keyword in the content request (step S72).

The request converting unit 73 references the second route table 61, identifies the content name corresponding to the keyword in the content request, and converts the content request including the keyword to a content request with a content name (step S73). The request transferring unit 74 in the processor 55 references the second route table 61 and identifies the transfer destination port corresponding to the keyword and content name in the content request (step S74).

The table control unit 71 in the processor 55 registers the request name in the content request with the content name, the requesting port, and the transfer destination port in the request table 62 in correspondence to one another (step S75). The request transferring unit 74 requests the distributing unit 52A to transfer the content request with the content name from the identified transfer destination port (step S76) and terminates the processing operation illustrated in FIG. 19.

If a content request including a keyword has not been received (the decision in step S71 is negative), the request deciding unit 72 terminates the processing operation illustrated in FIG. 19.

When the edge node EN, which executes edge-side request transfer processing illustrated in FIG. 19, receives a content request including a keyword, the content request coming from the PC 3, the edge node EN references the second route table 61 and identifies the content name and transfer destination port that correspond to the keyword. The edge node EN converts the content request including the keyword to a content request with a content name, and transfers the content request with the content name after the conversion to the identified transfer destination port. As a result, since the edge node EN converts a content request including a keyword, the content request coming from the PC 3, to a content request with a content name, the edge node EN can be used for the routing of a content name on the ICN NW 2.

Figure 20:
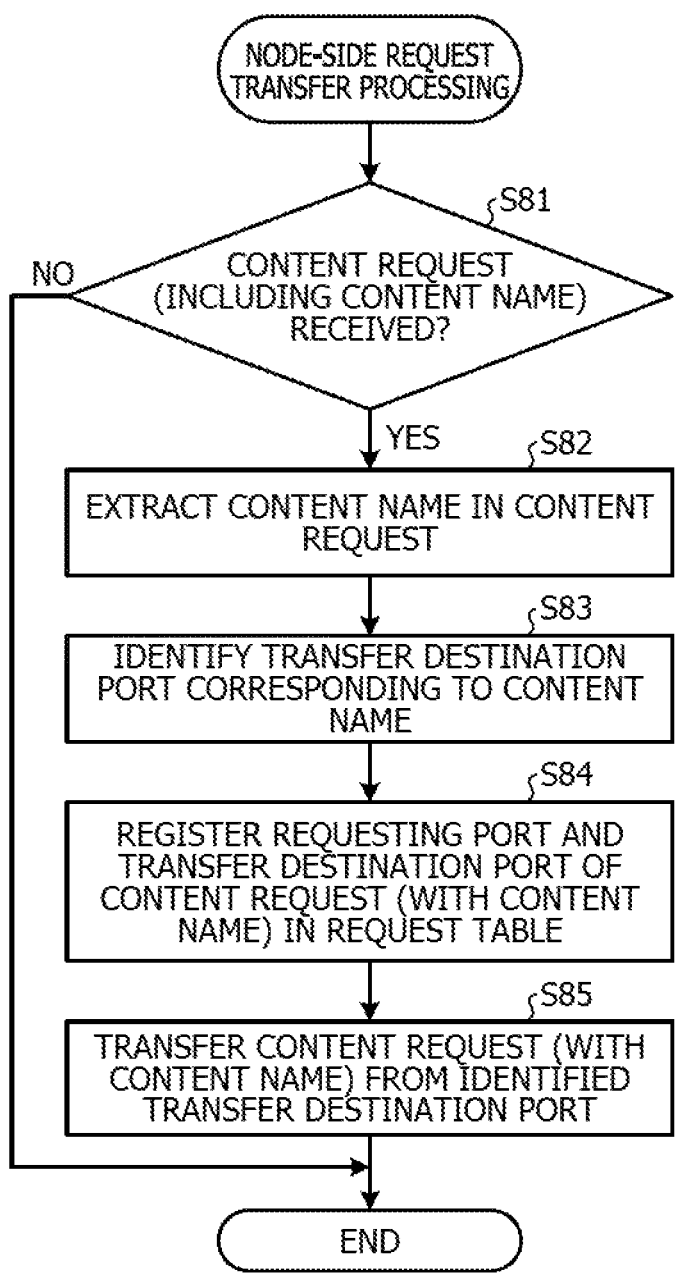
FIG. 20 is a flowchart illustrating an example of a processing operation of the processor in the node involved in node-side request transfer processing.

FIG. 20 is a flowchart illustrating an example of a processing operation of the node N11 involved in node-side request transfer processing. Incidentally, for convenience of explanation, the node N11 will be exemplified. However, since the nodes N12 and N13 also have the same structure as the node N11, like constituent elements will be denoted by like reference numerals and the descriptions of duplicated constituent elements and operations will be omitted.

The node N11 decides whether a content request with a content name has been received (step S81). If a content request with a content name has been received (the decision in step S81 is affirmative), the node N11 extracts the content name in the content request (step S82). The node N11 references the third route table 64 and identifies the transfer destination port corresponding to the content name (step S83).

The node N11 registers the request name in the content request with the content name, the requesting port, and the transfer destination port in a request table 82 (step S84). The node N11 transfers the content request with the content name from the identified transfer destination port (step S85) and terminates the processing operation illustrated in FIG. 20. If a content request with a content name has not been received (the decision in step S81 is negative), the node N11 terminates the processing operation illustrated in FIG. 20.

When the node N11, which executes node-side request transfer processing, receives the content request with a content name, the content request coming from the edge node EN, the node N11 references the third route table 64 and transfers the content request to the transfer destination port corresponding to the content name. As a result, the node N11 can transfer a content request with a content name.

In the communication system 1B in the third embodiment, a content request including a keyword is converted to a content request with a content name in the edge node EN, and the content request with the content name after the conversion is transferred to the node N11. Then, the node N11 transfers the content request with the content name to the servers SV1 and SV2. As a result, the servers SV1 and SV2 acquire the content corresponding to the content name in the content request, store the acquired content in a content response, and transfer the content response through the node N11 and edge node EN to the PC 3. As a result, the user of the PC 3 can acquire content even on the ICN NW 2 through a keyword-based content search. That is, in the communication system 1B, it is possible to achieve keyword-based content search with the structure of the existing ICN NW 2 just by changing the structure of the edge node EN, without changing the structures of the nodes N11, N12, and N13 coupled to the existing ICN NW 2.

In the third embodiment, neither a search server nor a DNS server is used at the time of requesting content, and the number of messages and the amount of data, the messages and data being used in communication on the ICN NW 2, can be reduced.

In the third embodiment, it is possible to achieve the specification of a keyword and the identification and acquisition of content with a single action without the intervention of the PC 3, and a plurality of pieces of content can be acquired with a content response in a batch.

In the third embodiment, it is possible to reduce the number of content responses messages by classifying a keyword in a content request and suppressing reception of potential duplicated content and to reduce the amount of communication by excluding reception of duplicated content.

In the third embodiment, it is possible to reduce the number of content response messages by combining a plurality of content responses and to reduce the amount of communication by excluding duplicated content.

In the third embodiment, since processing to perform classification of a content request and the combining of content responses is distributed and executed in a cascading manner. Therefore, unlike a case in which a PC executes processing in a concentrated manner as before, it is possible to achieve a large-scale batch search for content within the ICN NW 2.

In the third embodiment, processing for content requests and content responses are distributed to different nodes, so the PC 3 does not easily become a bottleneck in processing, so improvement of scalability can be expected. In particular, when the combining policy 63 for content responses is used to perform a computation among content to obtain, for example, the maximum value, minimum value, average, or the like, the effect of scalability improvement due to the reduction of the amount of data and the distribution of processing (the combining of content responses) is large.

In the third embodiment, content names and messages in keyword advertisement are involved at the time of preparation, and when content is requested, messages for a content request and content responses are involved. That is, in the third embodiment, messages to the search server and DNS server are not used. In addition, the numbers of content requests and content responses can be reduced. At the time of preparation as well, a small relative number of messages is sufficient, so a reduction in the number of messages can be achieved.

Incidentally, in the communication system 1B in the third embodiment described above, the numbers of PCs 3, edge nodes EN, nodes N11 to N13, servers SV1 and SV2 are not limited to the example illustrated in FIG. 15; these numbers can be appropriately changed.

Fourth Embodiment

Figure 21:
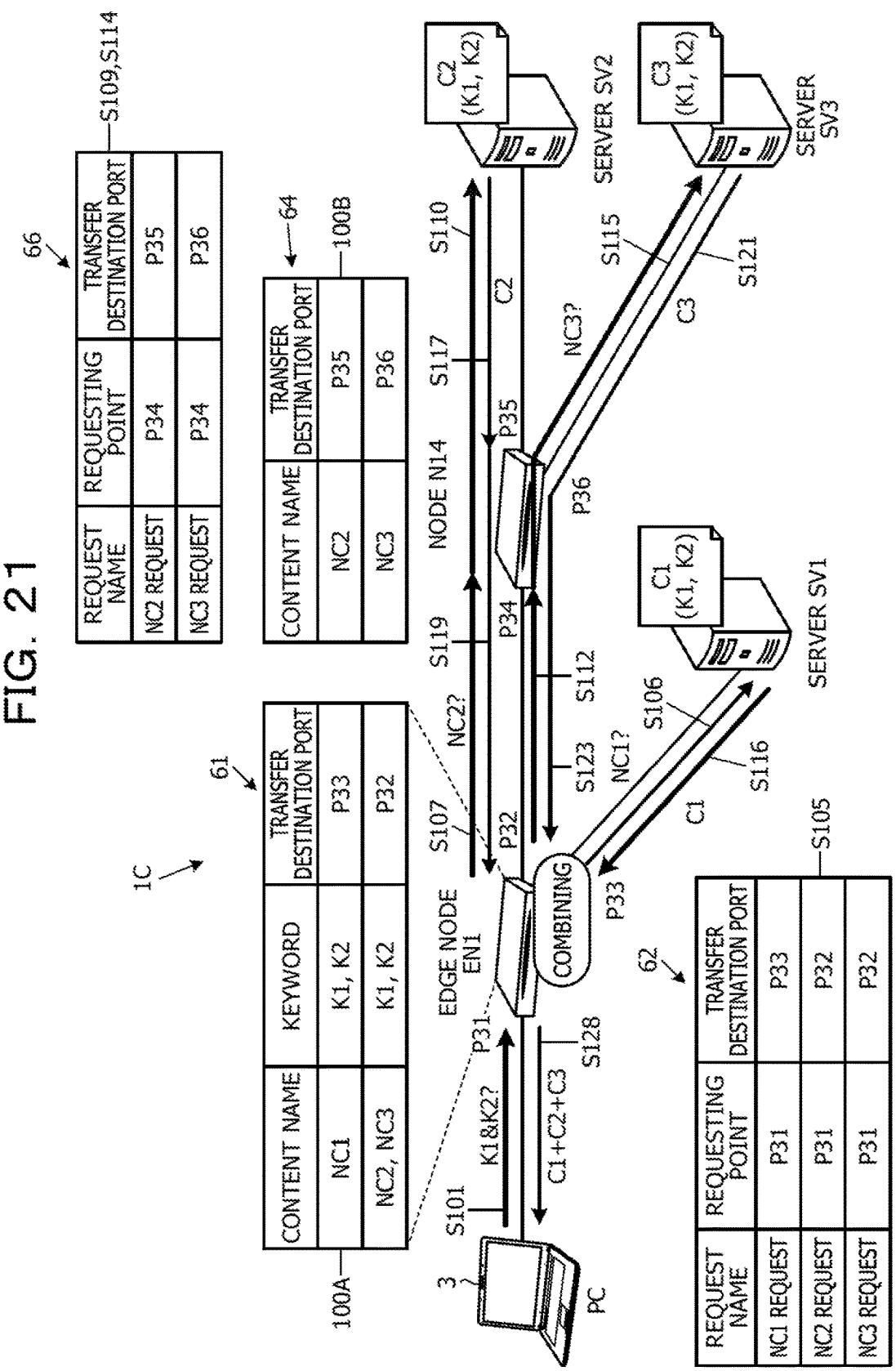
FIG. 21 is an explanatory diagram illustrating an example of a communication system in a fourth embodiment.
Figure 22:
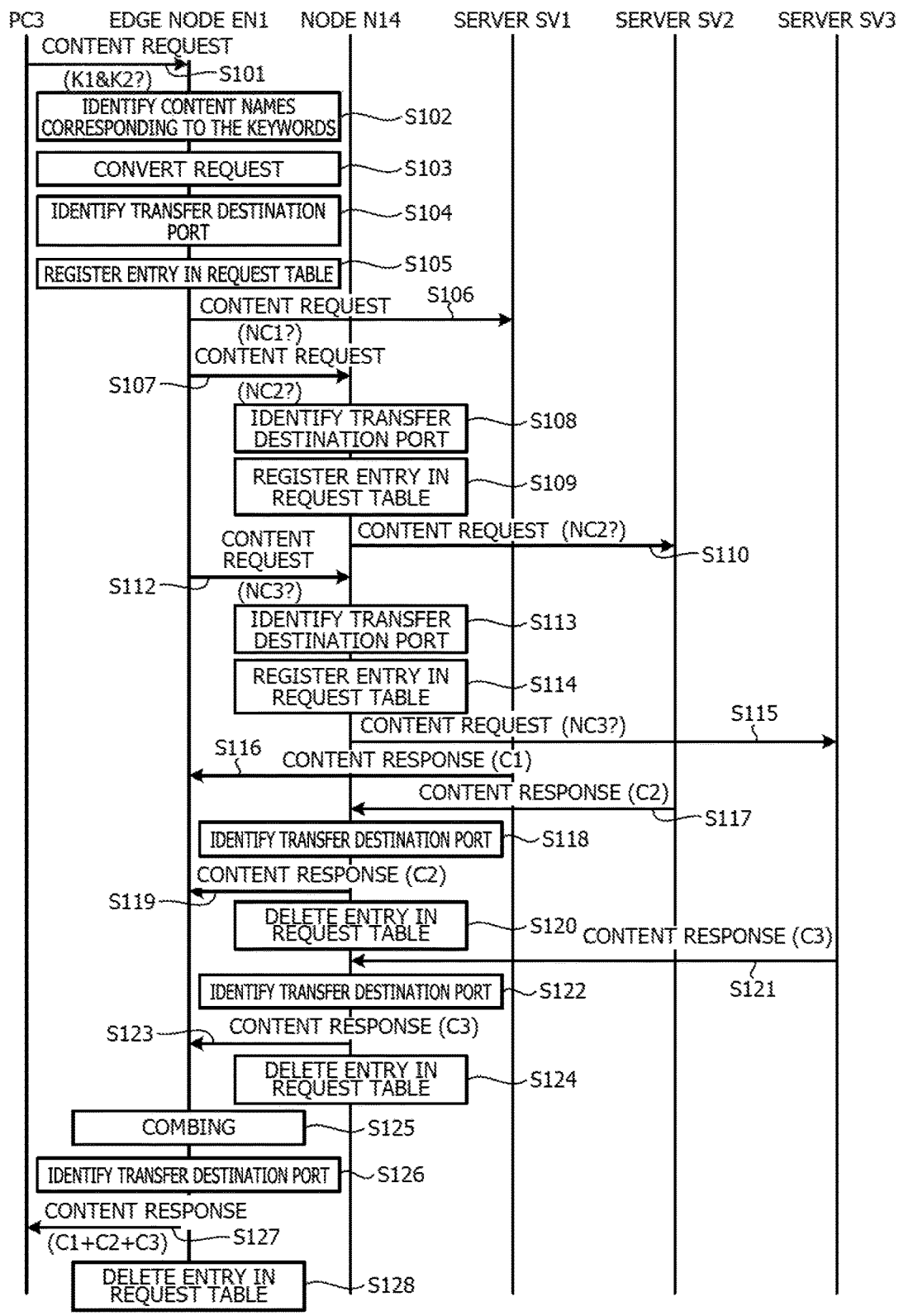
FIG. 22 is a timing diagram illustrating an example of a processing operation of the communication system from a content request to a content response.

FIG. 21 is an explanatory diagram illustrating an example of a communication system 1C in a fourth embodiment. FIG. 22 is a timing diagram illustrating an example of a processing operation of the communication system 1C from a content request to a content response. Incidentally, component elements that are the same as in the communication system 1B in the third embodiment will be denoted by the same reference numerals and the descriptions of duplicated constituent elements and operations will be omitted.

The communication system 1C illustrated in FIG. 21 has the PC 3, an edge node EN1, a node N14, and the servers SV1 to SV3. The edge node EN1 is coupled to a line between the edge node EN1 and the PC 3 at a port P31, a line between the edge node EN1 and the server SV1 at a port P33, and a line between the edge node EN1 and the node N14 at a port P32. Furthermore, the node N14 is coupled to a line between the node N14 and the edge node EN1 at a port P34, a line between the node N14 and the server SV2 at a port P35, and a line between the node N14 and the server SV3 at a port P36.

The server SV1 stores content C1 including the keywords K1 and K2 and enables the content C1 to be provided. The content name of the content C1 is CN1. The server SV2 stores content C2 including the keywords K1 and K2 and enables the content C2 to be provided. The content name of the content C2 is CN2. The server SV3 stores content C3 including the keywords K1 and K2 and enables the content C3 to be provided. The content name of the content C3 is CN3.

The edge node EN1 registers the content name NC1 and keywords K1 and K2, which have been received from the server SV1 in advertisement distribution, and the transfer destination port P33 in the second route table 61 in correspondence to one another (step S100A). Furthermore, the edge node EN1 registers the content names NC2 and NC3 and keywords K1 and K2, which have been received from the server SV2 in advertisement distribution, and the transfer destination port P32 in the second route table 61 in correspondence to one another. The node N14 registers the content name NC2 and transfer destination port P35 in the third route table 64 in correspondence to each other, and also registers the content name NC3 and transfer destination port P36 therein in correspondence to each other (step S100B). The PC 3 of the user transfers a content request (K1&K2?) including the keywords K1 and K2 to the edge node EN1 to request it to acquire content including the keywords K1 and K2 (step S101).

When the edge node EN1 receives the content request including the keywords K1 and K2, the edge node EN1 extracts the keywords K1 and K2 in the content request. Furthermore, the edge node EN1 references the second route table 61 and identifies the content names NC1, NC2, and NC3 corresponding to the keywords K1 and K2 (step S102). The edge node EN1 converts the content request including a keyword to a content request with a content request with the content names NC1, NC2, and NC3 (step S103).

Furthermore, the edge node EN1 references the second route table 61 and identifies the transfer destination port P33 corresponding to the content name NC1, and also identifies the transfer destination port P32 corresponding to the content names NC2 and NC3 (step S104).

The edge node EN1 registers "NC1 request", which is the request name of the content request after the conversion, the requesting port P31, and the transfer destination port P33 in the request table 62 (step S105). Furthermore, the edge node EN1 registers "NC2 request", which is the request name of the content request after the conversion, the requesting port P31, and the transfer destination port P32 in the request table 62. Furthermore, the edge node EN1 registers "NC3 request", which is the request name of the content request after the conversion, the requesting port P31, and the transfer destination port P32 in the request table 62.

Then, the edge node EN1 transfers a content request (NC1?) with the content name NC1 from the transfer destination port P33 (step S106). As a result, the server SV1 receives the content request with the content name NC1.

Furthermore, the edge node EN1 transfers a content request (NC2?) with the content name NC2 from the transfer destination port P32 (step S107). As a result, the node N14 receives the content request with the content name NC2. When the node N14 receives the content request with the content name NC2, the node N14 references the third route table 64 and identifies the transfer destination port P35 corresponding to the content name NC2 (step S108). Furthermore, the node N14 registers, as an entry, "NC2 request", which is the request name of the content request with the content name NC2, the requesting port P34, and the transfer destination port P35 in the request table 66 (step S109). The node N14 transfers a content request with the content name NC2 from the transfer destination port P35 (step S110). As a result, the server SV2 receives the content request with the content name NC2.

Furthermore, the edge node EN1 transfers a content request with the content name NC3 from the transfer destination port P32 (step S112). As a result, the node N14 receives the content request with the content name NC3. When the node N14 receives the content request with the content name NC3, the node N14 references the third route table 64 and identifies the transfer destination port P36 corresponding to the content name NC3 (step S113). Furthermore, the node N14 registers, as an entry, "NC3 request", which is the request name of the content request with the content name NC3, the requesting port P34, and the transfer destination port P36 in the request table 66 (step S114). Then, the node N14 transfers a content request with the content name NC3 from the transfer destination port P36 (step S115). As a result, the server SV3 receives the content request with the content name NC3.

When the server SV1 receives the content request with the content name NC1, the server SV1 acquires the content C1 with the content name NC1, stores the content C1 in a content response, and transfers the content response to the edge node EN1 (step S116). When the server SV2 receives the content request with the content name NC2, the server SV2 acquires the content C2 with the content name NC2, stores the content C2 in a content response, and transfers the content response to the node N14 (step S117). When the node N14 receives the content response including the content C2, the node N14 references the request table 66 and identifies the requesting port P34 corresponding to the content request with the content name C2 (step S118). The node N14 transfers the content request including the content C2 to the requesting port P34 (step S119). As a result, the edge node EN1 receives the content response including the content C2. Furthermore, the node N14 deletes the entry involved in the content request with the content name C2 from the request table 66 (step S120).

Furthermore, when the server SV3 receives the content request with the content name NC3, the server SV3 acquires the content C3 with the content name NC3, stores the content C3 in a content response, and transfers the content response to the node N14 (step S121).

When the node N14 receives the content response including the content C3, the node N14 references the request table 66 and identifies the requesting port P34 corresponding to the content request with the content name C3 (step S122). The node N14 transfers the content request including the content C3 to the requesting port P34 (step S123). As a result, the edge node EN1 receives the content response including the content C3. Furthermore, the node N14 deletes the entry involved in the content request with the content name C3 from the request table 66 (step S124).

When the edge node EN1 receives the content response including the content C1, the content response including the content C2, and the content response including the content C3, the edge node EN1 combines the content C1, C2, and C3 and stores the combined content in a content request (step S125).

The edge node EN1 identifies, from the request table 62, the requesting port P31 corresponding to content requests with the content names CN1, CN2, and CN3 (step S126). The edge node EN1 transfers the content request including the content C1, C2, and C3 to the requesting port P31 (step S127). As a result, the PC 3 receives the content response including the content C1, C2, and C3. The edge node EN1 deletes the entries involved in the content requests with the content names CN1, CN2, and CN3 from the request table 62 (step S128). The user of the PC 3 can acquire content C1, C2, and C3 even on the ICN NW 2 through a keyword-based content search.

Incidentally, in the third and fourth embodiments described above, all content that includes the keyword specified in a content request is collected from the servers SV1 and SV2 within the ICN NW 2, after which the collected content is combined into a single content response and the combined content response is transferred to the PC 3. If, however, the keyword is a general term, the content request is transferred infinitely within the ICN NW 2, resulting in a huge number of pieces of content in the content response. Therefore, a limit is imposed on the number of responses (a restriction is added) to avoid this situation. For example, an upper limit of the number of pieces of content to be combined in a content response may be determined, and domains and the number of hops that are used to send content requests may be restricted within a certain range to suppress as many pieces of content as the upper limit or more pieces of content from being collected or compiled. If, for example, the number of responses for content is to be limited, this limitation may be implemented by imposing a limit on the number of content requests to be sent to the ICN NW 2 by using an edge appli in the edge node EN.

In addition, the physical layouts of the constituent elements in each unit illustrated in the drawings may not be limited as illustrated in the drawings. That is, specific forms of the distribution and integration of individual units are not limited as illustrated in the drawings; all or part of these units may be functionally or physically distributed or integrated in a desired unit, depending on various loads, the usage status, and the like.

Furthermore, all or part of processing functions executed in each apparatus may be executed in a central processing unit (CPU), a digital signal processor (DSP), a field programmable gate array (FPGA), or the like. Alternatively, all or part of these processing functions may be executed by programs interpreted and executed by the CPU or the like or by wired-logic hardware.

Areas in which to store various types of information may be formed with a read-only memory (ROM) or a random-access memory (RAM) such as a synchronous dynamic random-access memory (SDRAM), a magnetoresistive random-access memory (MRAM), or a non-volatile random-access memory (NVAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
a first information processing apparatus including a first memory and a first processor coupled to the first memory; and
a communication apparatus including a second memory, a plurality of ports and a second processor coupled to the second memory and the plurality of ports, the communication apparatus being configured to communicate with a terminal apparatus, the communication apparatus being configured to communicate with a plurality of communication apparatuses including the first information processing apparatus through respective ports, the communication apparatus being configured to communicate with the first information processing apparatus through a first port of the plurality of ports,
wherein a first content is stored in the first information processing apparatus, and
the second processor is configured to:
   generate, when receiving a keyword related to a content which is included in the respective communication apparatuses via the respective ports, correspondence information including a combination of the keyword and the respective ports indicating a transfer destination port of a search request from the terminal apparatus;
   store the correspondence information in the second memory;
   receive, from the first processor, a first keyword related to the first content stored in the first information processing apparatus;
   generate, as the correspondence information, a first combination between the first keyword and the first port to which the first information processing apparatus is coupled,
   receive, from the terminal apparatus, a first search request that includes a search word,
   search, in the search word, the first keyword of the correspondence information stored in the second memory,
   when the search word includes the first keyword, specify, as the transfer destination port of the first search request from the terminal apparatus, the first port corresponding to the first keyword from the plurality of ports based on the first combination,
   send, through the first port, the first search request to the first information processing apparatus,
   acquire, through the first port, the first content from the first information processing apparatus, and
   send the first content to the terminal apparatus.

2. The communication system according to claim 1, further comprising:
a second information processing apparatus including a third memory and a third processor coupled to the third memory,
wherein the communication apparatus is configured to communicate with the second information processing apparatus through a second port of the plurality of ports,
wherein the third processor is configured to notify the communication apparatus of a second keyword related to a second content stored in the second information processing apparatus,
the communication apparatus is configured to receive the second keyword from the second information processing apparatus through the second port, and
the communication apparatus is configured to generate, as the correspondence information, a second combination between the second keyword and the second port to which the second information processing apparatus is coupled and store the correspondence information in the second memory.

3. The communication system according to claim 2, wherein when the search word includes the first keyword and the second keyword, generate, a first divided search request corresponding to the first keyword and a second divided search request corresponding to the second keyword,
specify the first port corresponding to the first keyword and the second port corresponding to the second keyword based on the correspondence information, and
send the first divided search request through the first port to the first information processing apparatus and the second divided search request through the second port to the second information processing apparatus.

4. The communication system according to claim 3, wherein the second processor is further configured to:
acquire the first content from the first information processing apparatus and the second content from the second information processing apparatus, and
send the first content and the second content to the terminal apparatus.

5. The communication system according to claim 4, wherein the second processor is further configured to:
when the first content and the second content are the same content, delete the second content, and
send the first content to the terminal apparatus.

6. The communication system according to claim 1, wherein the second processor is further configured to:
store, as the correspondence information, a third combination between the first keyword and a first content name indicating the first content, when the search word includes the first keyword,
specify, the first content name corresponding to the first keyword, based on the corresponding information,
generate a second search request including the first content name, and send the second search request to the first information processing apparatus through the first port.

7. The communication system according to claim 1, wherein the first processor is configured to notify the communication apparatus of the first content name.

8. A communication apparatus comprising:
a memory;
a plurality of ports; and
a processor coupled to the memory and to the plurality of ports,
wherein the communication apparatus is configured to communicate with a terminal apparatus, the communication apparatus is configured to communicate with a plurality of communication apparatus including the first information processing apparatus through respective ports, the communication apparatus is configured to communicate with a first information processing apparatus through a first port of the plurality of ports,
wherein the processor is configured to:
generate, when receiving a keyword related to a content which is included in the respective communication apparatuses via the respective ports, correspondence information including a combination of the keyword and the respective ports indicating a transfer destination port of a search request from the terminal apparatus;
store the correspondence information in the memory;
receive, from the first information apparatus, a first keyword related to the first content stored in the first information processing apparatus;
generate, as the correspondence information, a first combination between the first keyword and the first port to which the first information processing apparatus is coupled,
receive, from the terminal apparatus, a first search request that includes a search word,
search, in the search word, the first keyword of the correspondence information stored in the memory,
when the search word includes the first keyword, specify, as the transfer destination port of the first search request from the terminal apparatus, the first port corresponding to the first keyword from the plurality of ports based on the first combination,
send, through the first port, the first search request to the first information processing apparatus,
acquire, through the first port, the first content from the first information processing apparatus, and
send the first content to the terminal apparatus.

9. The communication apparatus according to claim 8, wherein the communication apparatus is configured to communicate with a second information processing apparatus through a second port of the plurality of ports, a second content is stored in the second information processing apparatus, and
the processor is further configured to:
receive a second keyword which is related to the second content and is notified by the second information processing apparatus through the second port, and
generate, as the correspondence information, a second combination between the second keyword and the second port to which the second information processing apparatus is coupled and store the correspondence information in the memory.

10. The communication apparatus according to claim 9, wherein when the search word includes the first keyword and the second keyword, generate a first divided search request corresponding to the first keyword and a second divided search request corresponding to the second keyword,
specify the first port corresponding to the first keyword and the second port corresponding to the second keyword based on the correspondence information, and
send the first divided search request through the first port to the first information processing apparatus and the second divided search request through the second port to the second information processing apparatus.

11. The communication apparatus according to claim 10, wherein the processor is further configured to:
acquire the first content from the first information processing apparatus and the second content from the second information processing apparatus, and
send the first content and the second content to the terminal apparatus.

12. The communication apparatus according to claim 11, wherein the processor is further configured to:
when the first content and the second content are the same content, delete the second content, and
send the first content to the terminal apparatus.

13. The communication apparatus according to claim 8, wherein the processor is further configured to:
store, as the correspondence information, a third combination between the first keyword and a first content name indicating the first content, when the search word includes the first keyword,
specify the first content name corresponding to the first keyword, based on the third corresponding information,
generate a second search request including the first content name, and
send the second search request to the first information processing apparatus through the first port.

14. The communication apparatus according to claim 8, wherein the processor is further configured to receive, from the first information processing apparatus, a notification indicating the first content name.

15. A method of communication using a terminal apparatus, a first information processing apparatus storing a first content and a communication apparatus including a plurality of ports, the communication apparatus being configured to communicate with a plurality of communication apparatus including the first information processing apparatus through respective ports, the communication apparatus being configured to communicate with the terminal apparatus, the communication apparatus being configured to communicate with the first information processing apparatus through a first port of the plurality of ports, the method comprising:
generating, by the communication apparatus, when receiving a keyword related to a content which is included in the respective communication apparatuses via the respective ports, correspondence information including a combination of the keyword and the respective ports indicating a transfer destination port of a search request from the terminal apparatus;
storing, by the communication apparatus, the correspondence information in a memory in the communication apparatus;
receiving, by the communication apparatus, from the first information processing apparatus, a first keyword related to the first content stored in the first information processing apparatus;
generating, by the communication apparatus, as the correspondence information, a first combination between the first keyword and the first port to which the first information processing apparatus is coupled;

receiving, by the communication apparatus, from the terminal apparatus, a first search request that includes a search word;

searching, in the search word, the first keyword of the correspondence information stored in the memory, when the search word includes the first keyword, specifying, by the communication apparatus, as the transfer destination port of the first search request from the terminal apparatus, the first port corresponding to the first keyword from the plurality of ports based on the first combination;

sending, by the communication apparatus, through the first port, the first search request to the first information processing apparatus;

acquiring, by the communication apparatus, through the first port, the first content from the first information processing apparatus; and sending, by the communication apparatus, the first content to the terminal apparatus.

16. The method according to claim 15, further comprising:

notifying, by a second information processing apparatus which communicates with the communication apparatus through a second port of the plurality of ports and stores second content, the communication apparatus of a second keyword related to the second content;

receiving, by the communication apparatus, the second keyword from the second information processing apparatus through the second port; and generating, by the communication apparatus, as the correspondence information, a second combination between the second keyword and the second port to which the second information processing apparatus is coupled and storing the correspondence information in the memory.

17. The method according to claim 16, further comprising:

when the search word includes the first keyword and the second keyword, generating, by the communication apparatus, a first divided search request corresponding to the first keyword and a second divided search request corresponding to the second keyword;

specifying, by the communication apparatus, the first port corresponding to the first keyword and the second port corresponding to the second keyword based on the correspondence information; and sending, by the communication apparatus, the first divided search request through the first port to the first information processing apparatus and the second divided search request through the second port to the second information processing apparatus.

18. The method according to claim 17, further comprising:

acquiring, by the communication apparatus, the first content from the first information processing apparatus and the second content from the second information processing apparatus; and sending, by the communication apparatus, the first content and the second content to the terminal apparatus.

19. The method according to claim 18, further comprising:

when the first content and the second content are the same content, deleting, by the communication apparatus, the second content; and sending, by the communication apparatus, the first content to the terminal apparatus.

20. The method according to claim 15, further comprising:

storing, by the communication apparatus, as the correspondence information, a third combination between the first keyword and a first content name indicating the first content;

when the search word includes the first keyword, specifying, by the communication apparatus, the first content name corresponding to the first keyword, based on the third corresponding information;

generating, by the communication apparatus, a second search request including the first content name; and sending, by the communication apparatus, the second search request to the first information processing apparatus through the first port.

* * * * *